(12) United States Patent
Fitzwater

(10) Patent No.: US 9,254,952 B2
(45) Date of Patent: Feb. 9, 2016

(54) PACKAGE WITH ENLARGED BASE

(71) Applicant: Graphic Packaging International, Inc., Marietta, GA (US)

(72) Inventor: Kelly R. Fitzwater, Lakewood, CO (US)

(73) Assignee: Graphic Packaging International, Inc., Atlanta, GA (US)

(*) Notice: Subject to any disclaimer, the term of this patent is extended or adjusted under 35 U.S.C. 154(b) by 584 days.

(21) Appl. No.: 13/644,649

(22) Filed: Oct. 4, 2012

(65) Prior Publication Data
US 2013/0026158 A1  Jan. 31, 2013

Related U.S. Application Data

(63) Continuation of application No. 12/658,556, filed on Feb. 11, 2011, now Pat. No. 8,309,896, which is a continuation of application No. PCT/US2008/050578, filed on Jan. 9, 2008.

(60) Provisional application No. 60/964,655, filed on Aug. 13, 2007.

(51) Int. Cl.
*H05B 6/80* (2006.01)
*H05B 6/64* (2006.01)
(Continued)

(52) U.S. Cl.
CPC .......... *B65D 81/3453* (2013.01); *B65D 5/0209* (2013.01); *B65D 5/54* (2013.01); *B65D 5/542* (2013.01); *B65D 2581/3472* (2013.01); *B65D 2581/3474* (2013.01);
(Continued)

(58) Field of Classification Search
CPC ........ B65D 5/0209; B65D 5/54; B65D 5/542; B65D 81/3453; B65D 2581/3494; B65D 2581/3474; B65D 2581/3477; B65D 2581/3478; B65D 2581/3479; B65D 2581/3472
USPC .......... 219/730, 725, 759, 762; 426/109, 234, 426/241, 243; 99/DIG. 14; 229/101.1, 103, 229/104, 117, 128, 117.06, 242, 903, 938
See application file for complete search history.

(56) References Cited

U.S. PATENT DOCUMENTS

| 359,435 A | 3/1887 | Elliott |
| 1,516,090 A | 11/1924 | Gary et al. |

(Continued)

FOREIGN PATENT DOCUMENTS

| CA | 2 586 472 A1 | 5/2006 |
| DE | 203 00 817 U1 | 4/2003 |

(Continued)

OTHER PUBLICATIONS

European Office Action dated May 9, 2014 in EP Application No. 08 727 453.6-1708.

(Continued)

*Primary Examiner* — Quang Van
(74) *Attorney, Agent, or Firm* — Womble Carlyle Sandridge & Rice, LLP

(57) ABSTRACT

A microwave heating construct may include a widened base. The construct may be erected by folding end panels of the construct towards one another and optionally securing the panels in the folded position. The construct may be formed from a blank. The construct and/or blank may include a removable portion at least partially defined by a line of disruption.

25 Claims, 9 Drawing Sheets

(51) Int. Cl.
  *B65D 43/00*  (2006.01)
  *B65D 81/34*  (2006.01)
  *B65D 5/02*  (2006.01)
  *B65D 5/54*  (2006.01)

(52) U.S. Cl.
  CPC ............ *B65D 2581/3477* (2013.01); *B65D 2581/3478* (2013.01); *B65D 2581/3479* (2013.01); *B65D 2581/3494* (2013.01)

(56) References Cited

U.S. PATENT DOCUMENTS

| | | |
|---|---|---|
| 2,132,966 A | 10/1938 | O'Brien |
| 3,240,419 A | 3/1966 | Spiering et al. |
| 3,324,998 A | 6/1967 | Farquhar |
| 3,637,130 A | 1/1972 | Farquhar |
| D234,396 S | 2/1975 | Killy |
| 4,190,757 A | 2/1980 | Turpin et al. |
| 4,228,945 A | 10/1980 | Wysocki |
| 4,267,420 A | 5/1981 | Brastad |
| 4,502,623 A * | 3/1985 | Moore et al. .......... 229/400 |
| 4,626,641 A | 12/1986 | Brown |
| 4,775,771 A | 10/1988 | Pawlowski |
| 4,780,587 A | 10/1988 | Brown |
| 4,865,921 A | 9/1989 | Hollenberg |
| 4,890,439 A | 1/1990 | Smart |
| 4,919,785 A | 4/1990 | Willey et al. |
| 4,936,935 A | 6/1990 | Beckett |
| 4,948,932 A | 8/1990 | Clough |
| 4,963,424 A | 10/1990 | Beckett |
| 5,034,234 A | 7/1991 | Andreas et al. |
| 5,039,364 A | 8/1991 | Beckett |
| 5,071,062 A | 12/1991 | Bradley et al. |
| 5,078,273 A | 1/1992 | Kuchenbecker |
| 5,096,723 A | 3/1992 | Turpin |
| 5,117,078 A | 5/1992 | Beckett |
| 5,175,404 A | 12/1992 | Andreas et al. |
| 5,213,902 A | 5/1993 | Beckett |
| 5,221,419 A | 6/1993 | Beckett |
| 5,260,537 A | 11/1993 | Beckett |
| 5,266,386 A | 11/1993 | Beckett |
| RE34,683 E | 8/1994 | Maynard |
| 5,340,436 A | 8/1994 | Beckett |
| 5,354,973 A | 10/1994 | Beckett |
| 5,410,135 A | 4/1995 | Pollart |
| 5,424,517 A | 6/1995 | Habeger |
| 5,484,100 A | 1/1996 | Rigby |
| 5,510,132 A | 4/1996 | Gallo, Jr. |
| D369,972 S | 5/1996 | Solheim |
| 5,519,195 A | 5/1996 | Keefer |
| 5,585,027 A | 12/1996 | Young |
| 5,628,921 A | 5/1997 | Beckett |
| 5,672,407 A | 9/1997 | Beckett |
| 5,688,427 A | 11/1997 | Gallo, Jr. |
| 5,759,422 A | 6/1998 | Schmelzer |
| 5,800,724 A | 9/1998 | Habeger |
| 5,938,110 A * | 8/1999 | Bernstein ............ 229/125.28 |
| 6,063,415 A | 5/2000 | Walters |
| 6,114,679 A | 9/2000 | Lai |
| 6,150,646 A | 11/2000 | Lai et al. |
| 6,204,492 B1 | 3/2001 | Zeng et al. |
| 6,251,451 B1 | 6/2001 | Zeng |
| D450,578 S | 11/2001 | Tomaselli et al. |
| 6,414,290 B1 | 7/2002 | Cole |
| 6,433,322 B2 | 8/2002 | Zeng et al. |
| 6,455,827 B2 | 9/2002 | Zeng |
| 6,552,315 B2 | 4/2003 | Zeng et al. |
| D484,798 S | 1/2004 | Bukowski |
| 6,677,563 B2 | 1/2004 | Lai |
| 6,683,289 B2 | 1/2004 | Whitmore et al. |
| 6,717,121 B2 | 4/2004 | Zeng |
| 6,744,028 B2 | 6/2004 | Chisholm et al. |
| 6,765,182 B2 | 7/2004 | Cole |
| 6,877,634 B2 | 4/2005 | Tramontina et al. |
| D573,458 S | 7/2008 | Anderson et al. |
| 7,414,230 B2 | 8/2008 | Fitzwater |
| 7,473,875 B2 | 1/2009 | Fitzwater |
| D600,940 S | 9/2009 | Elias et al. |
| D604,607 S | 11/2009 | Elisa et al. |
| D608,194 S | 1/2010 | Gajardo |
| 7,667,167 B2 | 2/2010 | Fitzwater |
| D621,282 S | 8/2010 | Yagi |
| D626,010 S | 10/2010 | Criss et al. |
| 7,893,389 B2 | 2/2011 | Fitzwater |
| D635,469 S | 4/2011 | Buitrago |
| 7,928,349 B2 | 4/2011 | Fitzwater |
| 7,982,167 B2 | 7/2011 | Fitzwater |
| D642,934 S | 8/2011 | Ly |
| 8,063,344 B2 | 11/2011 | Cole et al. |
| D652,295 S | 1/2012 | Hipperson et al. |
| D657,261 S | 4/2012 | De Gast |
| D662,412 S | 6/2012 | Delaney et al. |
| D662,428 S | 6/2012 | Martinez Rodriguez |
| D664,444 S | 7/2012 | Delaney et al. |
| D668,964 S | 10/2012 | Althoff |
| D670,557 S | 11/2012 | Hamina et al. |
| 8,309,896 B2 | 11/2012 | Fitzwater |
| 8,440,947 B2 | 5/2013 | Fitzwater |
| D694,106 S | 11/2013 | Fitzwater |
| D694,124 S | 11/2013 | Fitzwater |
| 8,872,078 B2 | 10/2014 | Fitzwater |
| D719,443 S | 12/2014 | Jones et al. |
| D727,145 S | 4/2015 | Fitzwater |
| 2003/0080120 A1 | 5/2003 | Whitmore et al. |
| 2003/0106899 A1 | 6/2003 | Langen |
| 2003/0206997 A1 | 11/2003 | Winkelman et al. |
| 2004/0023000 A1 | 2/2004 | Young et al. |
| 2004/0101605 A1 | 5/2004 | Sigel |
| 2005/0284865 A1 | 12/2005 | Fogle et al. |
| 2006/0049190 A1 | 3/2006 | Middleton |
| 2006/0096978 A1 | 5/2006 | Lafferty et al. |
| 2006/0113300 A1 | 6/2006 | Wnek et al. |
| 2007/0131742 A1 | 6/2007 | Fitzwater |
| 2007/0131743 A1 | 6/2007 | Fitzwater |
| 2007/0131744 A1 | 6/2007 | Fitzwater |
| 2007/0131745 A1 | 6/2007 | Fitzwater |
| 2007/0138247 A1 | 6/2007 | Fitzwater |
| 2008/0308614 A1 | 12/2008 | Fitzwater |
| 2009/0039077 A1 | 2/2009 | Fitzwater |
| 2010/0193509 A1 | 8/2010 | Fitzwater |
| 2011/0163090 A1 | 7/2011 | Fitzwater |
| 2013/0026158 A1 | 1/2013 | Fitzwater |
| 2013/0142921 A1 | 6/2013 | Fitzwater |

FOREIGN PATENT DOCUMENTS

| | | |
|---|---|---|
| EP | 1 452 458 A2 | 9/2004 |
| EP | 10004338 | 6/2010 |
| EP | 11005496 | 9/2011 |
| EP | 11005497 | 9/2011 |
| EP | 1200441.7 | 8/2012 |
| FR | 2 516 481 | 5/1983 |
| FR | 2 665 882 | 2/1992 |
| FR | 2 687 384 | 8/1993 |
| GB | 2 365 000 A | 2/2002 |
| JP | 2002-347756 | 12/2002 |
| JP | 2003-63565 | 3/2003 |
| JP | 2004-224402 A | 8/2004 |
| WO | WO 2006/052326 A2 | 5/2006 |
| WO | PCT/US2006/046755 | 6/2007 |
| WO | WO 2007/067705 | 6/2007 |
| WO | PCT/US2006/046755 | 3/2008 |
| WO | PCT/US2008/050578 | 5/2008 |
| WO | WO 2009/023286 A1 | 2/2009 |
| WO | PCT/US2008/050578 | 2/2010 |

OTHER PUBLICATIONS

United States Patent and Trademark Office, Petition for *Inter Partes* Review of U.S. Pat. No. 8,872,078, Inline Packaging, LLC (Petitioner) v. Graphic Packaging International, Inc. (Patent Owner), filed Jul. 22, 2015.
United States Patent and Trademark Office, Petition for *Inter Partes* Review of U.S. Pat. No. 8,872,078, Inline Packaging, LLC (Peti-

(56) References Cited

OTHER PUBLICATIONS tioner) v. *Graphic Packaging International, Inc.* (Patent Owner), filed Jul. 22, 2015. Exhibit 1017 Picture of Hot Pockerts® From 2002 Management Report for Nestlé.
United States Patent and Trademark Office, Petition for *Inter Partes* Review of U.S. Pat. No. 8,872,078, *Inline Packaging, LLC* (Petitioner) v. *Graphic Packaging International, Inc.* (Patent Owner), filed Jul. 22, 2015. Exhibit 1003 Declaration of Dr. Claire Koelsch Sand.
United States Patent and Trademark Office, Petition for *Inter Partes* Review of U.S. Pat. No. 8,872,078, *Inline Packaging, LLC* (Petitioner) v. *Graphic Packaging International, Inc.* (Patent Owner), filed Jul. 22, 2015. Exhibit 1018 Redlined Comparisons of Independent Claims for '078 Patent.

\* cited by examiner

PACKAGE WITH ENLARGED BASE

CROSS-REFERENCE TO RELATED APPLICATIONS

This application is a continuation of U.S. patent application Ser. No. 12/658,556, filed Feb. 11, 2010, which is a continuation of International Application No. PCT/US08/050,578, filed Jan. 9, 2008, which claims the benefit of U.S. Provisional Application No. 60/964,655, filed Aug. 13, 2007, both of which are incorporated by reference herein in their entirety.

TECHNICAL FIELD

The present invention relates to various blanks, constructs, and methods for heating, browning, and/or crisping a food item, and particularly relates to various blanks, constructs, and methods for heating, browning, and/or crisping a food item in a microwave oven.

BACKGROUND

There is a need for a package or other construct that facilitates transportation and consumption of a food item therein. There also is a need for such a package or other construct that enhances browning and crisping of a food item in a microwave oven. There further is a need for a package or other construct that provides enhanced browning and/or crisping of an irregular shaped food item and facilitates transportation and consumption of the food item.

SUMMARY

The present invention generally is directed to various blanks and sleeves, pouches, packages, and other constructs (collectively "constructs") formed therefrom. The various constructs formed from the blanks feature an enlarged or widened base that may provide stability for handling a food item within the construct. If desired, the constructs may include one or more features that allow a consumer to access various portions of the food item therein as the food item is consumed. Additionally, any of the constructs of the invention may include features that enhance the browning and crisping of the food item heated therein.

In one aspect, numerous blanks are contemplated by the invention. Each blank generally comprises a plurality of adjoined panels. Each panel has a first dimension extending in a first direction and a second dimension extending in a second direction, where the first direction is substantially perpendicular to the second direction. The plurality of adjoined panels may include a main panel, a first minor panel joined to the main panel, a second minor panel joined to the main panel, a major panel joined to the first minor panel, and an end panel. The main panel, the first minor panel, the second minor panel, and the major panel may be joined respectively to one another along a plurality of respective substantially parallel fold lines extending in the first direction. The end panel may be joined to the main panel along a substantially arcuate fold line extending generally in the second direction. The end panel has an end edge opposite the arcuate fold line. The second dimension of the end panel generally increases from the arcuate fold line to the end edge, such that the end panel has a generally flared shape. A microwave energy interactive element may overlie at least a portion of at least one of the adjoined panels.

In one example, the end panel includes a pair of opposed side edges that extend divergently from the arcuate fold line to the end edge. The end edge of the end panel may be substantially arcuate in shape, and in some example, the end edge may be outwardly arcuate in shape.

In another example, the major panel is a first major panel, and the plurality of adjoined panels further includes a second major panel joined to the second minor panel along a fold line extending in the first direction, a first partial end panel joined to the first major panel along a first curved fold line extending generally in the second direction, and a second partial end panel joined to the second major panel along a second curved fold line extending generally in the second direction.

The various blanks typically include a pair of opposed surfaces. A microwave energy interactive element may overlie at least a portion of at least one of the adjoined panels on at least one of the opposed surfaces. The microwave energy interactive element may comprise a susceptor, a foil, a segmented foil (i.e., a plurality of metal foil segments), or any combination thereof. In one example, the microwave energy interactive element converts at least a portion of impinging microwave energy into thermal energy.

If desired, any of the various blanks of the invention may include a removable portion defined at least partially by a line of disruption. The removable portion may include at least a portion of at least one of the first main panel, the second main panel, the first minor panel, and the second minor panel.

In one example, the removable portion is defined at least partially by a transverse tear line extending in the second direction substantially across the adjoined panels, an oblique tear line substantially abutting the transverse tear line, and a cutout adjacent to the oblique tear line. In one variation, the cutout extends inwardly from a first peripheral edge of the blank extending in the second direction and at least partially defines a tab adjacent to the first peripheral edge. The oblique tear line may extend substantially between the tab and the transverse tear line. In another variation, the cutout is disposed distal from the first peripheral edge within at least one panel of the plurality of adjoined panels, and a pair of oblique tear lines may extend convergently towards the cutout. In one example, a first oblique tear line extends substantially between the cutout and the transverse tear line, and a second oblique tear line extends substantially between the cutout and the first peripheral edge of the blank.

In another example, the removable portion is defined at least partially by a tear line extending in the second direction substantially across the adjoined panels. The removable portion may include a grasping feature extending from a first peripheral edge of the blank extending in the first direction, and a cutout along a second peripheral edge extending in the first direction opposite the first peripheral edge, such that the cutout is substantially opposite the grasping feature. In one variation, the blank includes a second removable portion defined at least partially by a second tear line extending in the second direction substantially across the adjoined panels. The second removable portion may include a grasping feature extending from the first peripheral edge of the blank and a cutout along the second peripheral edge opposite the grasping feature.

In another example, the removable portion is defined at least partially by a tear line extending in the second direction substantially across the adjoined panels, and the removable portion includes a grasping feature defined at least partially by a line of disruption in the second minor panel. In one variation, the line of disruption is a substantially arcuate slit including a pair of ends disposed substantially along the fold line adjoining the main panel and the second minor panel. The blank further may include a pair of tear lines in the main panel extending divergently from respective ends of the slit. In one embodiment, a first tear line substantially abuts the transverse tear line and a second tear line substantially abuts an edge of the main panel extending in the second direction.

In another example, the removable portion is a first removable portion of a plurality of removable portions defined by a plurality of tear lines extending obliquely across at least a portion of least one of the plurality of adjoined panels. Each tear line has a first end and a second end, at least one of which substantially abuts a peripheral edge of the blank. In one variation, the peripheral edge includes a first edge and a second edge extending in the first direction opposite one another, and at least one tear line of the plurality of tear lines extends substantially between the first edge and the second edge. In another variation, each tear line of the plurality of tear lines is substantially parallel to each other tear line of the plurality of tear lines. In yet another variation, the plurality of tear lines includes at least a first tear line, a second tear line, and a third tear line, and the first tear line is spaced from the second tear line a distance that is approximately equal to a distance between the second tear line and the third tear line.

In another example, at least some of the fold lines adjoining the panels are tear lines, and the removable portion is defined at least partially by a first tear line that adjoins a first pair of adjacent panels and a second tear line that adjoins a second pair of adjacent panels. The removable portion may include at least one of the first minor panel, the second minor panel, the first major panel, the second major panel, and the main panel. In one variation, a tab extends from an end of at least one of the first minor panel and the second minor panel. In still another variation, the blank may include a foldable portion defined a least partially by a fold line extending in the second direction substantially across at least one of the plurality of adjoined panels.

In another example, the removable portion is defined at least partially by a line of disruption initiating and terminating proximate a first peripheral edge of the blank opposite the arcuate end edge. The line of disruption may comprise a cut line, a score line, a kiss cut line, a perforated line, a zigzag cut line, a zipper cut line, or any combination thereof. In one variation, the removable portion includes at least a portion of the main panel. In another variation, the line of disruption initiates and terminates along the first peripheral edge of the blank adjacent to the main panel. At least a portion of the line of disruption may extend into the end panel. The portion of the line of disruption that extends into the end panel may define a tab.

Any of the various blanks may be formed into a construct (e.g., a sleeve) for heating, browning, and/or crisping a food item in a microwave oven. The construct may comprise a first main panel and a second main panel in an opposed configuration, and a first minor panel and a second minor panel in an opposed configuration. The first main panel, the second main panel, the first minor panel, and the second minor panel are joined to the first main panel and the second main panel along respective fold lines to define at least partially an interior surface. A microwave energy interactive element may overlie at least a portion of the interior surface. The microwave energy interactive element may comprise a susceptor, a foil, a segmented foil, or any combination thereof.

The construct also includes a first end panel foldably joined to the first main panel. The first end panel includes a pair of opposed side edges that generally extend divergently from the first main panel. In some embodiments, the construct also may include a second end panel foldably joined to the second main panel. The second end panel includes a pair of opposed side edges that may extend convergently (i.e., taper inwardly) from the second main panel.

In one configuration, the first end panel and the second end panel are in a substantially opposed, facing relationship. In this configuration, the construct resembles a sleeve with a pair of opposed, open ends. The first end panel and the second end panel may be adapted to be folded toward the interior space in a generally superposed configuration. In doing so, the sleeve may be transformed into a container for holding the food item in an upright configuration, with the superposed end panels serving as the base of the container.

In one example of this variation, the first end panel includes an arcuate end edge that extends between the pair of opposed side edges of the first end panel. In another example, the second end panel includes a substantially linear end edge that extends between the pair of opposed side edges of the second end panel. In yet another example, a locking feature extends from the substantially linear edge of the second end panel, and the locking feature is adapted to be received within a slot in the first end panel. In this manner, the end panels are locked into position to support the food item more securely.

If desired, the construct may include a removable portion defined at least partially by a line of disruption. The removable portion may comprise at least a portion of at least one of the first main panel, the second main panel, the first minor panel, and the second minor panel. In various examples, the removable portion may comprise a removable portion of a blank from which the construct is formed, for example, the blanks described above and others described herein and/or contemplated hereby.

In one example, the removable portion is defined at least partially by a transverse tear line extending substantially across at least one of the adjoined panels, an oblique tear line substantially abutting the transverse tear line, and a cutout adjacent to the oblique tear line. In one variation, the cutout extends inwardly from a first end of the construct and at least partially defines a tab. The tab may be disposed adjacent to the first end of the construct, and the oblique tear line may extend substantially between the tab and the transverse tear line. In another variation, the cutout is disposed within at least one of the first main panel, second main panel, first minor panel, and second minor panel distal from a first end of the construct.

In another example, the removable portion is defined at least partially by a transverse tear line extending substantially across each of the first main panel, the second main panel, first minor panel, and second minor panel. The removable portion may include a grasping feature projecting from at least one of the first main panel and the second main panel distal from the fold lines adjoining the respective main panel to the first minor panel and the second minor panel. In one variation, the construct further includes a second removable portion adjacent to the first removable portion.

In a further example, the removable portion is defined at least partially by a transverse tear line extending substantially across at least the first main panel and the second main panel. The removable portion includes a grasping feature defined by a line of disruption in the second minor panel. In one variation, the line of disruption is a slit, and the slit defines a tab comprising a portion of the second minor panel.

In still another example, the removable portion is defined at least partially by a line of disruption extending obliquely across at least one of the first main panel, the second main panel, the first minor panel, and the second minor panel.

In yet another example, at least one of the fold lines adjoining the first main panel, the second main panel, the first minor panel, and the second minor panel is a tear line, and the removable portion is defined by at least one tear line that adjoins at least one of the first main panel and the second main panel to at least one of the first minor panel and the second minor panel.

In another aspect, the removable portion is defined by a line of disruption initiating and terminating proximate a first end of at least one of the adjoined panels. In one variation, the line of disruption initiates and terminates proximate the first end of the first main panel. The line of disruption may extend into the end panel and may define a tab.

If desired, the sleeve may be transformed into a container in which the food item can be positioned in an upright configuration for transportation and/or consumption. The container generally may include a pair of opposed main panels, a pair of opposed minor panels joined to the main panels along respective fold lines, and a pair of end panels collectively defining an interior space. The end panels may be folded toward the interior space in a superposed configuration. The container may be positioned in an upright configuration with the food item being supported by the end panels. If desired, the end panels may be configured to provide a base for the container that is larger than the opening, thereby providing greater stability of the container and the food item or items therein.

The container may include one or more removable portions that allow a user to reduce the size of, or alter the shape of, the container. The removable portion may be separated from the remainder of the construct as the food item is consumed to allow greater access to the food item. The removable portion may comprise the removable portion of the sleeve from which the container is formed, for example, as described herein or otherwise contemplated hereby.

Other features, aspects, and embodiments will be apparent from the following description and accompanying figures.

BRIEF DESCRIPTION OF THE DRAWINGS

The description refers to the accompanying drawings, in which like reference characters refer to like parts throughout the several views, and in which.

DESCRIPTION

The present invention may be illustrated further by referring to the figures. For purposes of simplicity, like numerals may be used to describe like features. It will be understood that where a plurality of similar features are depicted, not all of such features necessarily are labeled on each figure. It also will be understood that various components used to form the blanks and constructs of the present invention may be interchanged. Thus, while only certain combinations are illustrated herein, numerous other combinations and configurations are contemplated hereby.

Figure 1A:
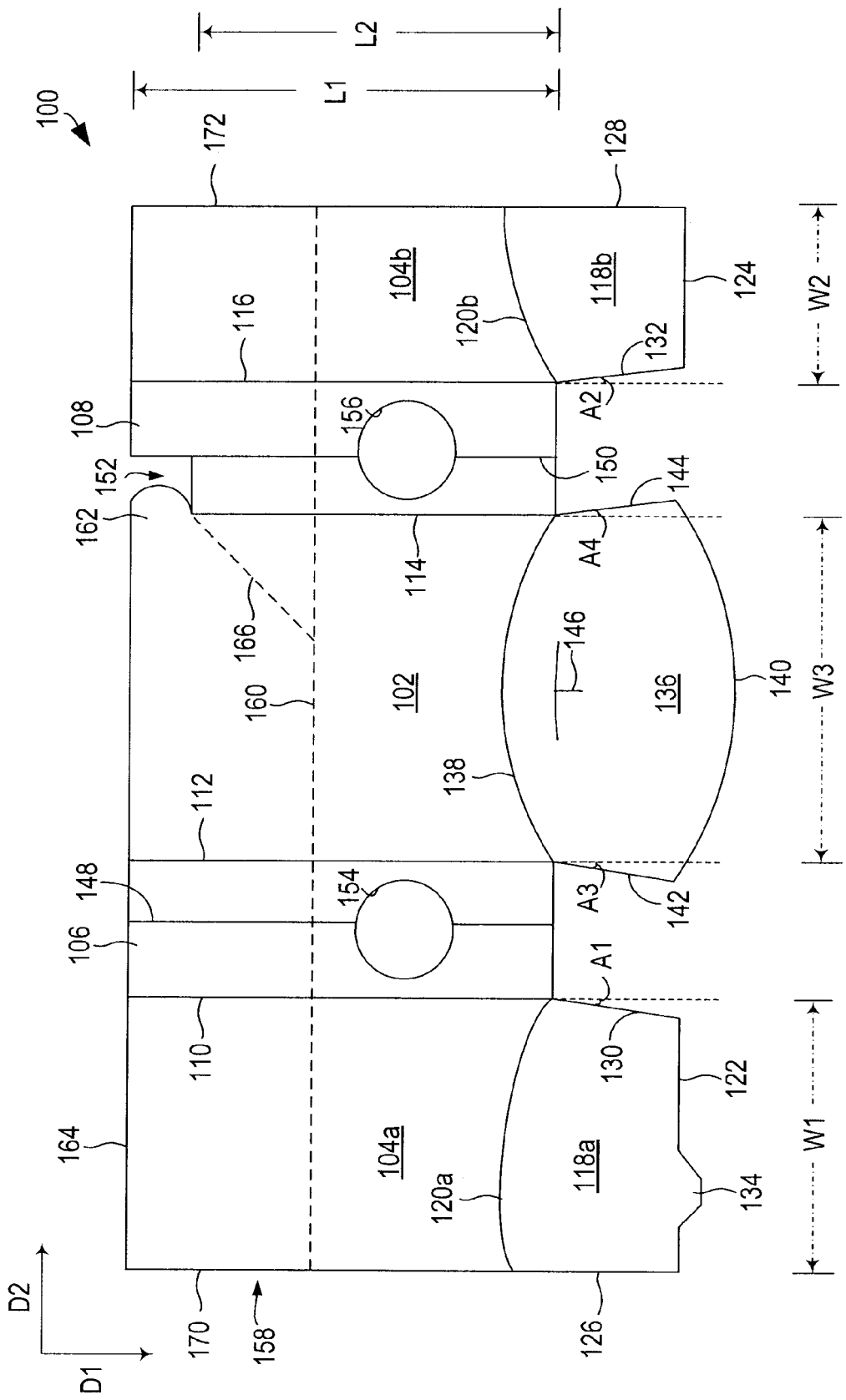
FIG. 1A is a schematic top plan view of a first side of an exemplary blank according to various aspects of the invention.

FIG. 1A depicts an exemplary blank 100 according to various aspects of the present invention. The blank 100 includes a plurality of adjoined panels. In this and other examples of the invention discussed herein and/or contemplated hereby, each of the various panels and the blank generally has a first dimension, for example, a length, extending in a first direction, for example, a longitudinal direction, D1, and a second dimension, for example, a width, extending in a second direction, for example, a transverse direction, D2. It will be understood that such designations are made only for convenience and do not necessarily refer to or limit the manner in which the blank is manufactured or erected into a construct.

Still viewing FIG. 1A, the blank 100 includes a plurality of adjoined panels including a main panel 102, a first major panel 104a, a second major panel 104b, a first minor panel 106, and a second minor panel 108. The first minor panel 106 is joined to first major panel 104a along a longitudinal fold line 110. The main panel 102 is joined to the first minor panel 106 along a longitudinal fold line 112. The second minor panel 108 is joined to the main panel 102 along a longitudinal fold line 114. The second major panel 104b is joined to the second minor panel 108 along a longitudinal fold line 116. Fold lines 110, 112, 116 are substantially parallel and substantially equal in length, as indicated by L1. Fold line 114 is substantially parallel to fold lines 110, 112, and 116, but is somewhat shorter in length, as indicated by L2.

The blank 100 includes partial end panels 118a, 118b respectively joined to panels 104a, 104b along respective curved fold line segments 120a, 120b. Each partial end panel 118a, 118b includes a respective end edge 122, 124 that extends in the second direction, a respective exterior edge 126, 128 that extends in the first direction between the respective fold line segment 120a, 120b and the respective end edge 122, 124, and a respective interior edge 130, 132 that extends obliquely between the respective fold line segment 120a, 120b and the respective end edge 122, 124. Edges 130, 132 form respective angles A1, A2 with respect to theoretical extensions of fold lines 110, 116 (shown with dashed lines in FIG. 1A), such that the respective width W1, W2 of each partial end panel 118a, 118b tapers or decreases from the respective fold line segment 120a, 120b to the respective end edge 122, 124. Optionally, partial end panel 118a includes a tab or other locking feature 134 extending from end edge 122.

The blank 100 also includes an end panel 136 joined to the main panel 102 along a substantially arcuate fold line 138. In this example, the end panel 136 is somewhat lentiform in shape (i.e., shaped like a biconvex lens), with an outwardly arcuate end edge 140 opposite arcuate fold line 138. In this example, the end panel 136 is asymmetrical or flared in shape, with a pair of side edges 142, 144 that extend divergently and obliquely from the endpoints of fold line 138 to the endpoints of end edge 140. However, more symmetrical end panels are contemplated. Edges 142, 144 form respective angles A3, A4 with respect to theoretical extensions of fold lines 112, 114 (shown with dashed lines in FIG. 1A), such that the width W3 of the end panel 136 increases from fold line 138 to end edge 140. In this example, angles A3 and A4 are substantially equal. However, it is contemplated that angles A3 and A4 may differ. The end panel 136 includes a somewhat T-shaped slit 146 substantially centered between side edges 142, 144. The slit 146 is generally configured to receive the locking feature 134.

In this and other aspects of the invention, it will be understood that other shapes for the end panel 136 and various other panels are contemplated. For example, any of the various panels may be oval, rectangular, square, diamond-shaped, trapezoidal, polygonal, or may be any other regular or irregular shape. It also is contemplated that fold line 138 and end edge 140 may have any suitable shape, for example, curved, V-shape, zigzag shape, or any other linear, curvilinear, symmetrical, or asymmetrical shape.

If desired, one or both of the first minor panel 106 and the second minor panel 108 may include respective longitudinal fold lines 148, 150. Fold line 148 divides minor panel 106 into two sections or segments, each having a length L1. Fold line 150 divides minor panel 108 into two sections or segments having differing lengths, L1 and L2, thereby defining a cutout 152. The length of minor panel 106 is approximately equal to the length of the portion of minor panel 108 that lies between fold line 150 and fold line 116.

In this example, longitudinal fold lines 148, 150 are slightly offset from the longitudinal centerline of respective panels 106, 108. Specifically, fold line 148 is slightly closer to fold line 112 and fold line 150 is slightly closer to fold line 114. By configuring the fold lines 148, 150 in this manner, when a construct 174 is formed from the blank 100 and substantially flattened by folding along fold lines 148, 150, the endpoints of edge 140 do not extend beyond fold lines 110 and 116 (best seen in FIGS. 1D and 1E). Likewise, tab 162 does not extend beyond fold line 116. This allows for more efficient cutting of the blank 100 and more efficient packaging and shipping of the construct 174. It will be understood that the precise positioning of fold lines 148 and 150 will vary depending on the shape of end panel 136, the length of edges 142, 144, 140, and angles A3, A4. Thus, in some embodiments, one or both of fold lines 158, 160 may be substantially centered or may be offset respectively towards fold lines 110, 112, 114, 116.

Returning to FIG. 1A, the first minor panel 106 and the second minor panel 108 optionally include one or more respective apertures 154, 156. In the example shown in FIG. 1A, aperture 154 is substantially circular in shape and is substantially centered between fold lines 110, 112. Likewise, aperture 156 is substantially circular in shape and is substantially centered between longitudinal fold lines 114, 116. However, it will be understood that in this and other aspects of the invention described herein and contemplated hereby, the number, shape, size, and positioning of such apertures may vary for a particular application depending on type of construct being formed from the blank, the food item to be heated therein or thereon, the desired degree of browning and/or crisping, whether direct exposure to microwave energy is needed or desired to attain uniform heating of the food item, the need for regulating the change in temperature of the food item through direct heating, and whether and to what extent there is a need for venting.

Still viewing FIG. 1A, the blank 100 includes a removable portion 158 defined at least partially by a tear line or other line of disruption 160 extending in the transverse direction across at least a portion of panels 102, 104a, 104b, 106, 108. The removable portion 158 includes an extension or tab 162 extending from the main panel 102 adjacent to peripheral edge 164 of the blank 100. An oblique tear line 166 extends from the tab 162 towards, and may abut, tear line 160. In this example, the tab 162 is somewhat rounded in shape. However, it will be understood that, in this and other examples, the tab or extension may have any shape as needed or desired. For example, the extension may be oval, rectangular, square, diamond-shaped, trapezoidal, polygonal, or any other regular or irregular shape. Alternatively, the tear lines 160, 166, cutout 152, and tab 162 may be omitted.

Figure 1B:
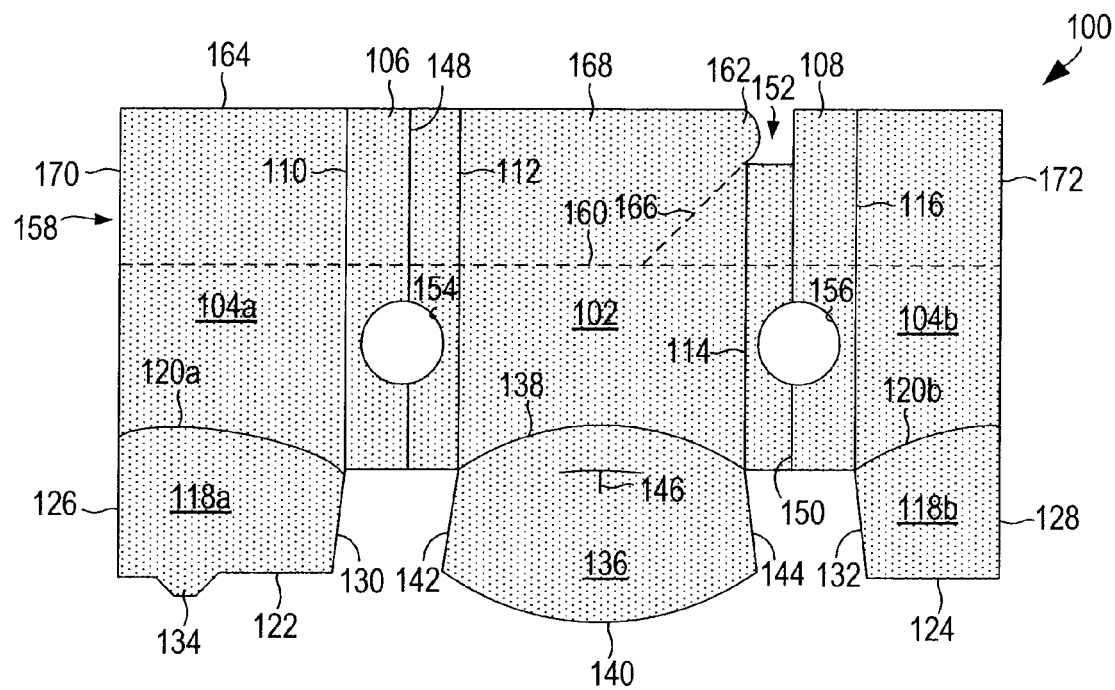
FIG. 1B is a schematic top plan view of a second side of the blank of FIG. 1A opposite the first side.

If desired, a microwave energy interactive element 168 may overlie at least a portion of blank 100, as shown schematically by stippling in FIG. 1B. The microwave energy interactive element may define at least a portion of the interior surface of a construct 170, 182 formed from the blank 100, as shown schematically by stippling in FIGS. 1C-1H. In one example, the microwave energy interactive element comprises a susceptor. However, other microwave energy interactive elements, such as those described below, are contemplated for use with the invention.

Figure 1C:
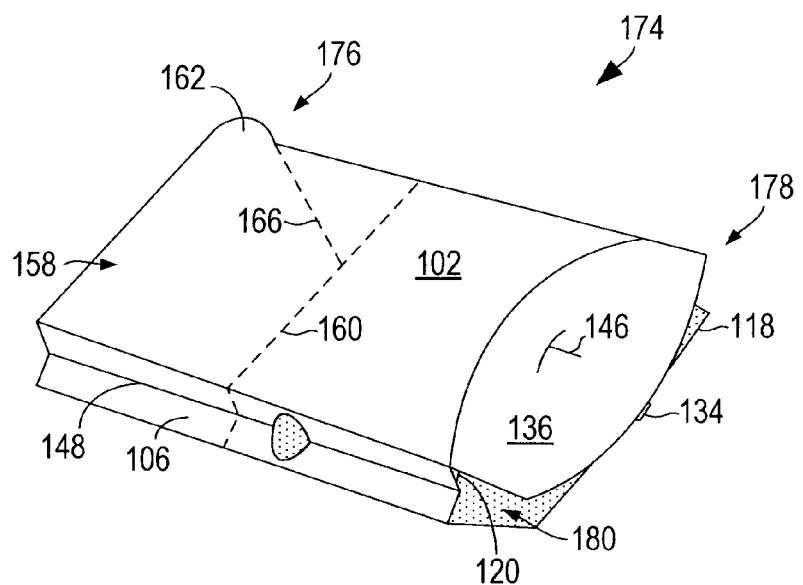
FIG. 1C is a schematic perspective view of the blank of FIGS. 1A and 1B formed into a sleeve with two open ends, according to various aspects of the invention.
Figure 1D:
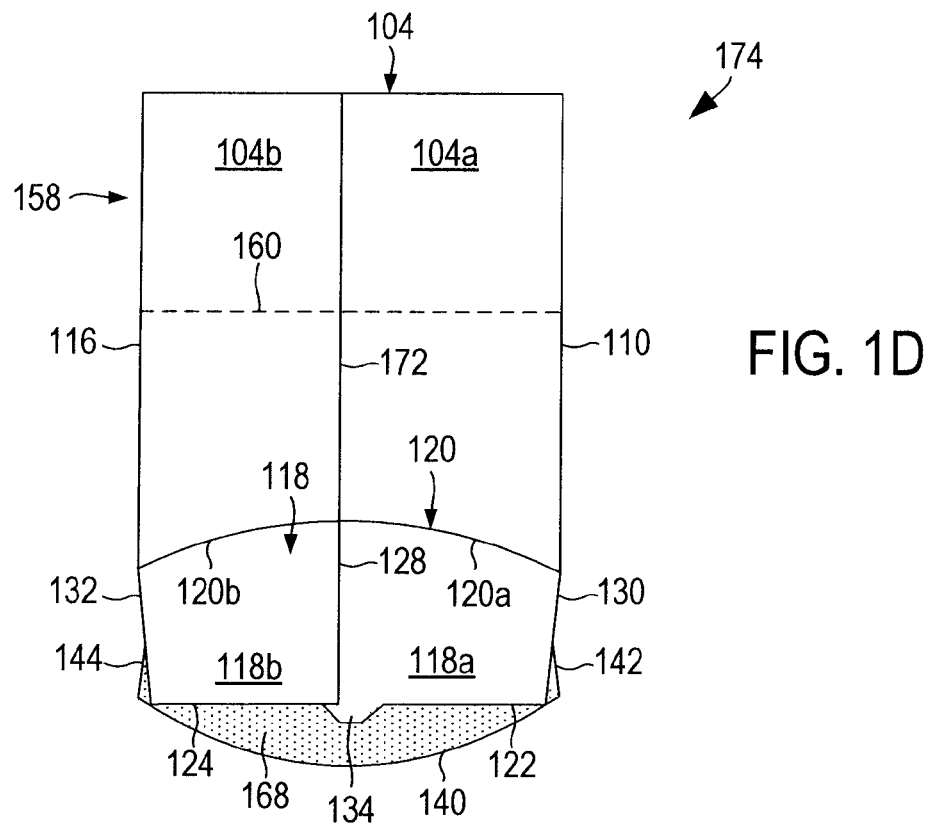
FIG. 1D is a schematic bottom plan view of the sleeve of FIG. 1C.
Figure 1E:
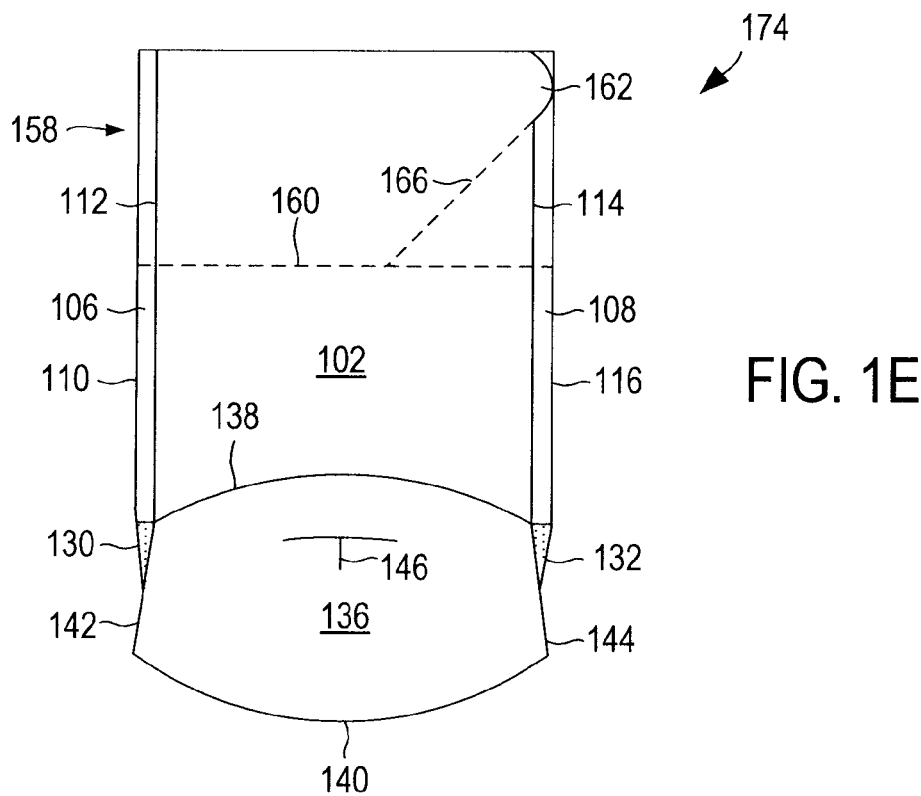
FIG. 1E is a schematic top plan view of the sleeve of FIG. 1C.

Turning now to FIGS. 1C-1E, numerous sequences of steps may be used to form a sleeve or other construct according to the invention. In one example shown in FIG. 1C, the blank 100 may be folded along longitudinal fold lines 110, 112, 114, 116 and edges 170, 172 brought towards each other to form a sleeve 174 having two open ends 176, 178 with a cavity or interior space 180 therebetween. As shown schematically in FIG. 1D, the first and second major panels 104a, 104b may be overlapped as needed to form a second main panel 104, partial end panels 118a, 118b may be overlapped as needed to form end panel 118, and fold line segments 120a, 120b may be overlapped as needed to form fold line 120. The overlapped panels may be joined to one another using an adhesive or other suitable material or technique. In this configuration, the panels 118, 136 are in a substantially opposed, facing relationship with the opposed side edges 142, 144 of end panel 136 extending divergently from the first main panel 102 and opposed side edges 130, 132 of end panel 118 extending convergently from the second main panel 104.

It will be understood that, in some embodiments (not shown), the first major panel 104a (or simply "major panel") may be dimensioned so that no additional major panel (e.g., the second major panel 104b) is needed to form the second main panel 104. In such an example, the major panel 104a may be folded over and glued to the respective minor panel using a glue flap or otherwise, such that the major panel 104a would serve as the second main panel 104. Further, it will be understood that although several exemplary blanks are illustrated herein, numerous other blanks may be used to form a construct according to the invention. Thus, the invention is not limited to blanks with the left-to-right arrangement of panels illustrated in the figures. Instead, a blank may have "leftmost" and "rightmost" panel (as viewed, for example, in the figures) comprising a main panel, a major panel, a minor panel, a glue flap, or any combination thereof.

The first minor panel 106 and second minor panel 108 form opposed side walls for the construct 170, which may be flattened partially (FIG. 1C) or substantially (FIGS. 1D and 1E) by folding inwardly along fold lines 148, 150. The sleeve 174 includes a removable portion 158 comprising the removable portion 158 of the blank 100.

To use the construct 170 according to one acceptable method, a food item (not shown) may be inserted through an open end 176 or 178, and the construct with the food item inside may be placed into a microwave oven (not shown). As the food item is heated, the susceptor 168 converts microwave energy to thermal energy, which generally enhances the browning and/or crisping of the surface of the food item. Since many food items have a somewhat irregular shape, it is contemplated that in this and other aspects of the invention, any of the panels, for example, the first main panel 102, the first major panel 104a, or the second major panel 104b, may include one or more fold lines, score lines, cut lines, cut crease lines, or other lines of disruption along all or a portion of the length or width thereof to accommodate the contours of the particular food item heated therein and to bring the susceptor 168 into closer proximity with the surface of the food item. Any steam generated during heating may be released through the open ends 176, 178 of the sleeve 170 and/or through apertures 154, 156.

Figures 1F, 1G:
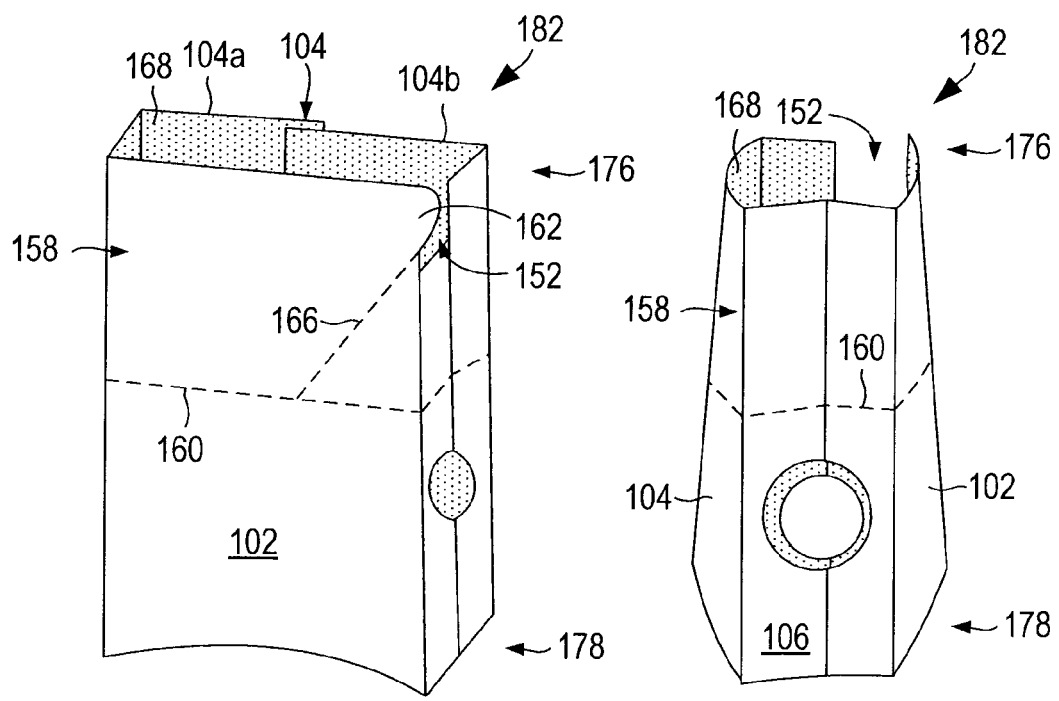
FIGS. 1F and 1G are schematic perspective views of the blank of FIGS. 1A and 1B and sleeve of FIGS. 1C-1E formed into a container for carrying a food item therein, according to various aspects of the invention.

After the item is heated sufficiently, the user may remove the food item and discard the construct 170. Alternatively, the user may fold end panels 118 and 136 towards the interior 180 of the sleeve 170 to form a container or construct 182 having an open end 176 and a closed end 178, as shown in FIGS. 1F and 1G. Alternatively still, the closed end 178 may be formed at other times.

The container 182 may be used to support the food item in an upright configuration with the food item resting on the overlapped panels 118, 136, which collectively serve as a base for the container 182. This provides a convenient means for comfortably handling the heated food item. Tab 134 may be inserted into slit 146 to secure the end panels 118, 136 in a locked configuration.

As best illustrated in FIG. 1G, the closed end or base 178 of the container 182 is somewhat enlarged or widened relative to the open end 176, causing the sides 102, 104 (comprising panels 102a, 102b, 104 of blank 100) to bulge somewhat outwardly from the interior space 180. As a result, the construct 182 may be able to accommodate various irregular shaped food items, for example, croissant sandwiches, baguettes, calzones, or any other item. Furthermore, by having a wider base, the container 182 may be more stable when seated in an upright configuration on a surface. Such a shape also might be easier to grasp for some users.

Figure 1H:
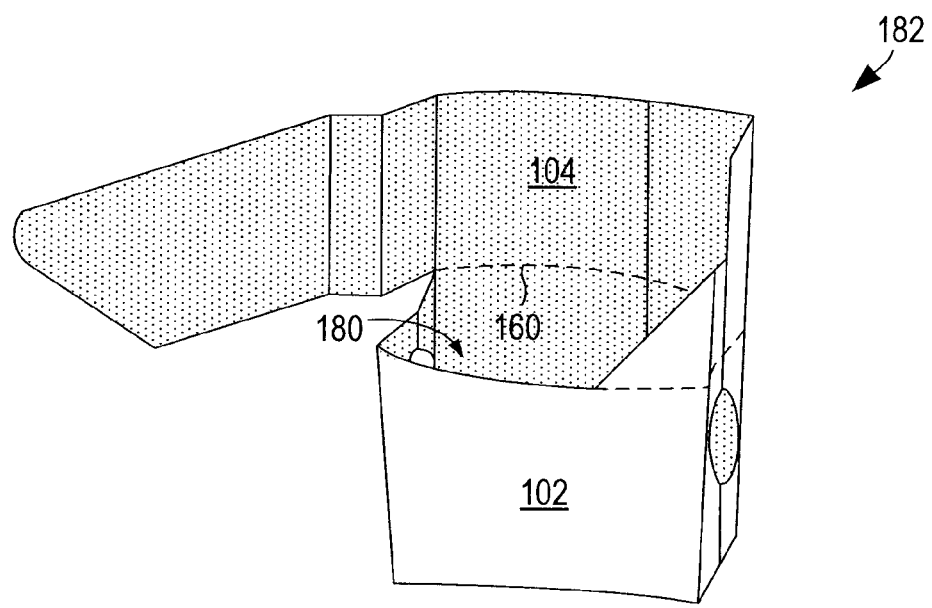
FIG. 1H is a schematic perspective view of the container of FIGS. 1F and 1G with the removable portion partially separated from the container.

As the food item is consumed, the construct 182 may begin to interfere with accessing the food item. If desired, the user may insert a finger or other implement into cutout 152, grasp tab 162, and begin to separate the removable portion 158 from the remainder of the construct 182 along tear lines 160, 166, as shown in FIG. 1H. Further pulling results in complete separation of the removable portion 158 from the construct 182, thereby allowing greater access to the food item therein.

It will be understood that while the exemplary blank 100 of FIGS. 1A and 1B and the exemplary constructs 174, 182 of FIGS. 1C-1H include only one removable portion 158, any number and configuration of removable portions may be used in accordance with the invention. Additionally, it will be understood that in this and other aspects of the invention, any type of tear line or other line of disruption may be used to define the removable portion. For example, the line of disruption may include a score line, a cut line, a perforated line, kiss cut line, zigzag cut line, zipper cut line, any other suitable line of disruption, or any combination thereof.

FIGS. 2-10 illustrate examples of blanks including other arrangements of tear lines, cutouts, and other features that define removable portions. Such arrangements of tear lines may be used with other blanks, as illustrated in U.S. Patent Application Publication No. US 2007/0131742A1, U.S. Patent Application Publication No. US 2007/0131743A1, U.S. Patent Application Publication No. US 2007/0131744A1, U.S. Patent Application Publication No. US 2007/0131745A1, U.S. Patent Application Publication No. US 2007/0138247A1, and PCT Publication No. WO/2007/067705, each of which is incorporated by reference herein in its entirety.

The various blanks 200, 300, 400, 500, 600, 700, 800, 900, 1000 include features that are similar to blank 100 shown in FIGS. 1A and 1B, except for variations noted and variations that will be understood by those of skill in the art. For simplicity, and not limitation, the reference numerals of similar features are preceded in the figures with a "2" (FIG. 2), "3" (FIG. 3), "4"(FIG. 4), "5" (FIG. 5), "6" (FIG. 6), "7" (FIG. 7), "8" (FIG. 8), "9" (FIG. 9), "10" (FIG. 10) instead of a "1". Such blanks may be used to form sleeves, containers, and other constructs according to the invention, as described in connection with FIGS. 1A-1H.

Figure 2:
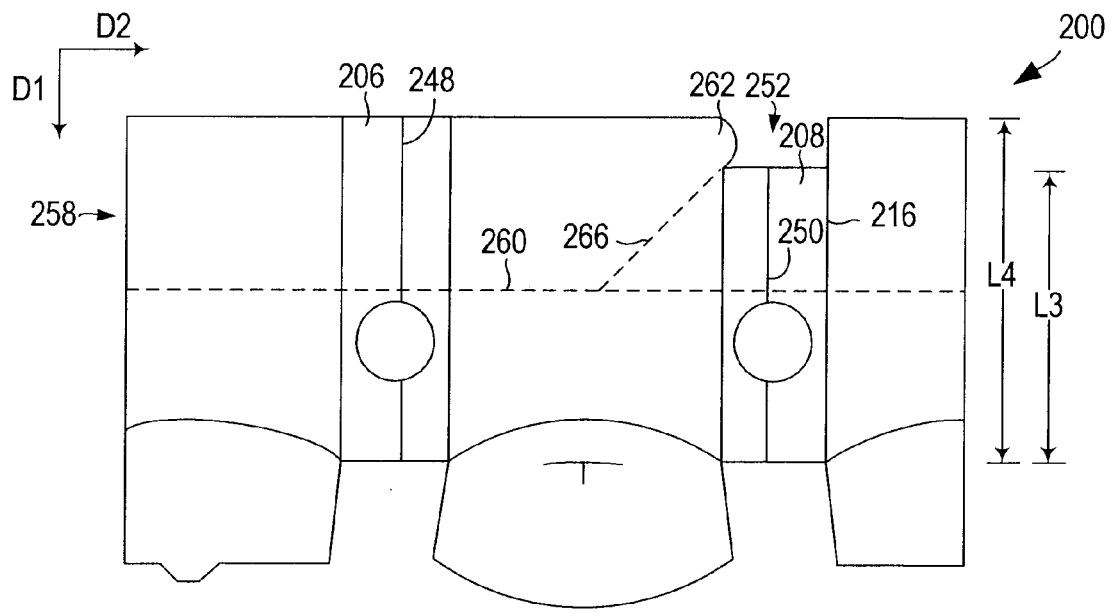
FIG. 2 is a schematic top plan view of a variation of the exemplary blank of FIG. 1A, according to various aspects of the invention.

Viewing FIG. 2, the blank 200 is similar to the blank 100 of FIG. 1, except that cutout 252 extends substantially between tab 262 and fold line 216. Thus, minor panel 208 has an overall length L3 that is less than the length L4 of minor panel 206. Likewise, fold line 250 has a length L3 that is less than the length L4 of fold line 248. In some instances, the larger cutout 252 may facilitate separation of the removable portion 258 along tear lines 260, 266.

Figure 3:
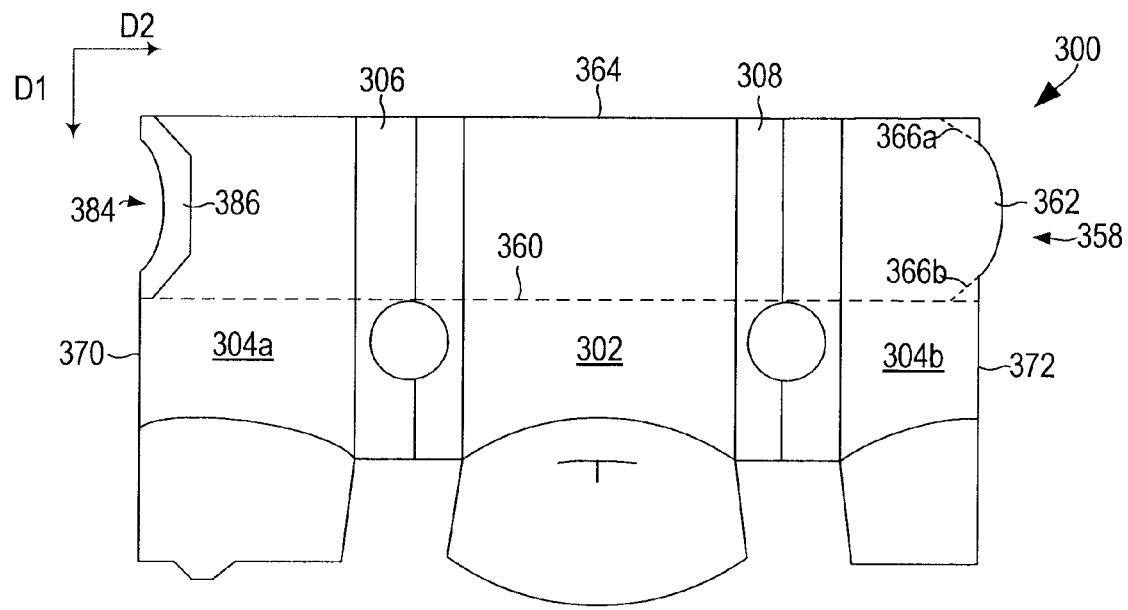
FIG. 3 is a schematic top plan view of yet another exemplary blank according to various aspects of the invention, including a removable portion defined by a transverse tear line.

FIG. 3 schematically depicts another blank 300 according to various aspects of the invention. The blank 300 includes a removable portion 358 at least partially defined by a transverse line of disruption or tear line 360 extending across at least a portion of each of panels 302, 304a, 304b, 306, 308. The removable portion 358 includes an extension or tab 362 that partially defines edge 372. In this example, the tab 362 is somewhat arcuate in shape. However, it will be understood that the extension may have any shape as needed or desired, such as those described above. Tear lines 366a, 366b extend from tab 362 and terminate proximate edge 364 and transverse tear line 360, respectively. Tear lines 366a, 366b cooperate with tab 362 to facilitate removal of the removable portion 358. The tab and tear lines may have any suitable shape and configuration.

The removable portion 358 also includes a cutout 384 that partially defines edge 370. In this example, cutout 384 is somewhat arcuate in shape. As with the tab, the cutout may have any suitable shape as needed or desired, which may or may not correspond to the shape or dimensions of the tab. The removable portion 358 also includes a gluing area 386 adjacent the cutout 384. In the blank 300 shown in FIG. 3, the gluing area 386 is shaped somewhat like an arch or bridge. However, it will be understood that the gluing area may have any suitable shape as needed or desired.

Figure 4:
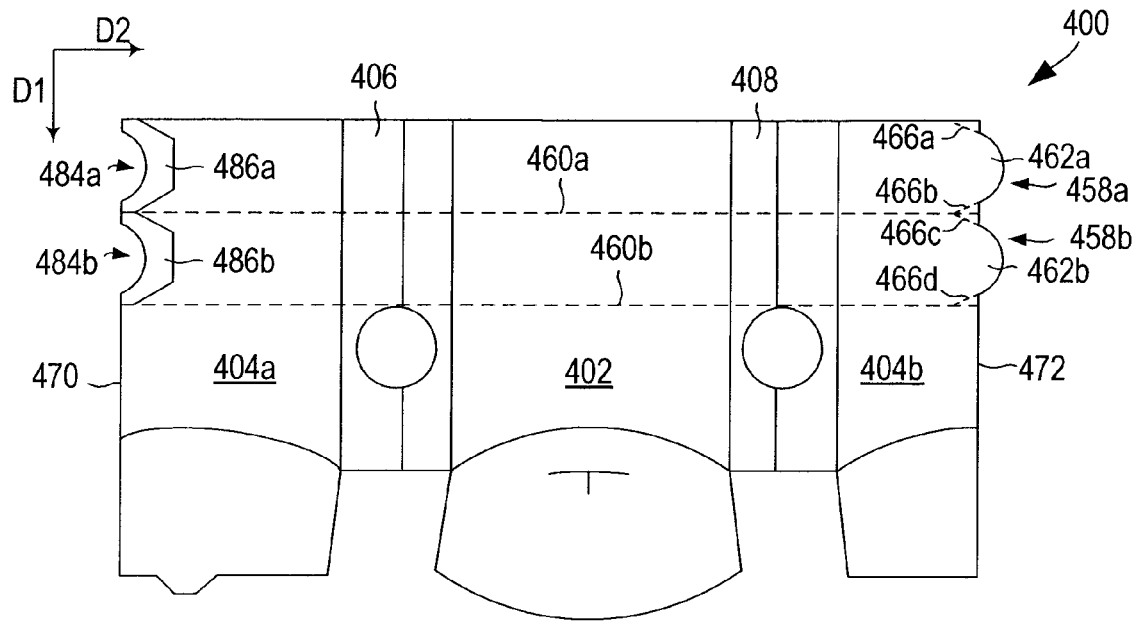
FIG. 4 is a schematic top plan view of still another exemplary blank according to various aspects of the invention, including first and second removable portions defined by first and second transverse tear lines.

FIG. 4 schematically depicts another blank 400 according to various aspects of the invention. In this example, the blank 400 includes a first removable portion 458a and a second removable portion 458b, each extending in the transverse direction. Each removable portion 458a, 458b includes at least a portion of each of panels 402, 404a, 404b, 406, 408. The first removable portion 458a is joined to the second removable portion 458b along a transverse tear line 460a. The second removable portion 458b is joined to the remainder of panels 402, 404a, 404b, 406, 408 along a transverse tear line 460b.

The first and second removable portions 458a, 458b each include respective extensions or tabs 462a, 462b that partially define a peripheral edge 472 extending in the longitudinal direction. In this example, tabs 462a, 462b are substantially arcuate in shape. However, it will be understood that the extension may have any shape as needed or desired, such as those described above. Tear lines 466a, 466b extend from and may cooperate with tab 462a to facilitate removal of removable portion 458a. Likewise, tear lines 466c, 466d extend from and may cooperate with tab 462b to facilitate removal of removable portion 458b.

The first and second removable portions 458a, 458b each include a respective cutout 484a, 484b that partially define peripheral edge 470 extending in the longitudinal direction. In this example, cutouts 484a, 484b are substantially semi-circular or arcuate in shape. However, cutouts 484a, 484b may have any suitable shape as needed or desired, and may or may not correspond to the shape or dimensions of tabs 462a, 462b. The removable portions 458a, 458b also include respective gluing areas 486a, 486b adjacent to cutouts 484a, 484b. In this example, gluing areas 486a, 486b are shaped somewhat like an arch or bridge. However, the gluing areas may have any suitable shape as needed or desired.

Figure 5:
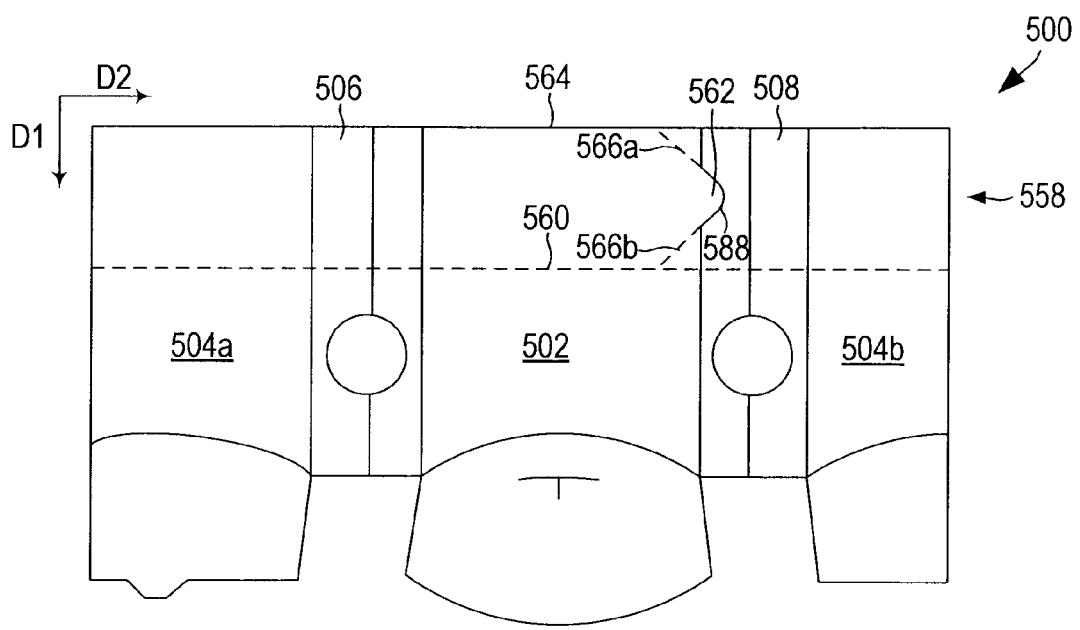
FIG. 5 is a schematic top plan view of another exemplary blank according to various aspects of the invention, including a removable portion defined by a transverse tear line.

FIG. 5 schematically depicts another blank 500 according to various aspects of the invention. The blank 500 includes a removable portion 558 defined at least partially by a transverse tear line 560 extending across a portion of each of panels 502, 504a, 504b, 506, 508.

The removable portion 558 includes a somewhat triangular tab 562 extending from the main panel 502. In this example, tab 562 comprises at least a portion of minor panel 508 and is defined by a somewhat arcuate or V-shaped cut line 588. However, it will be understood that the location and shape of tab 562 may vary for a particular application. Tear lines 566a, 566b extend from cut line 588 towards, and may abut, edge 564 and transverse tear line 560, respectively, and may cooperate with tab 562 to facilitate removal of the removable portion 558.

Figure 6:
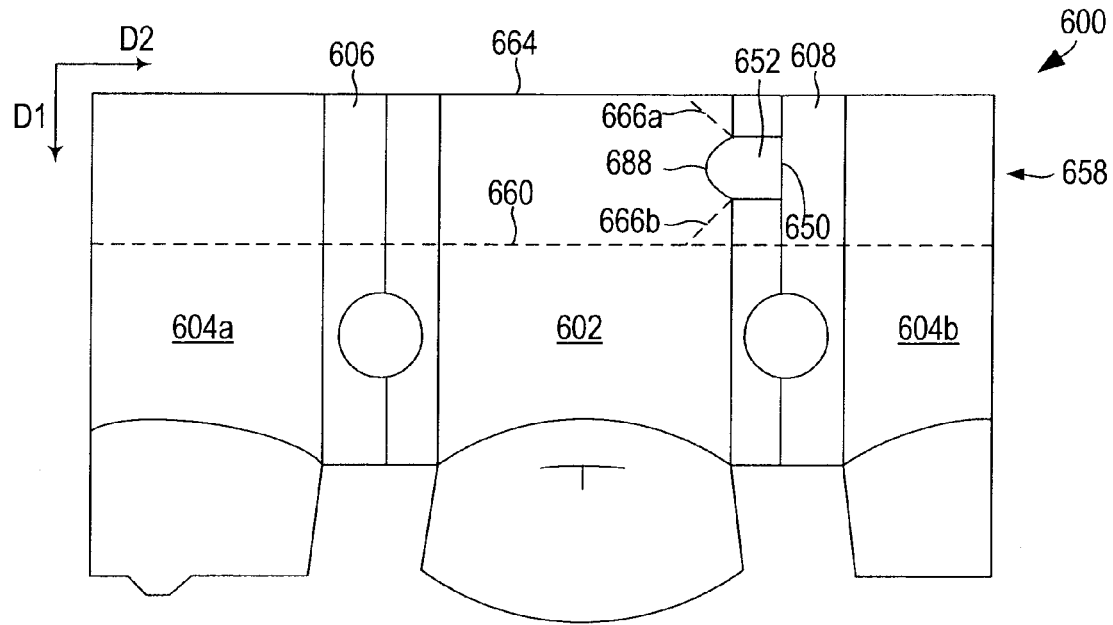
FIG. 6 is a schematic top plan view of still another exemplary blank according to various aspects of the invention, including a removable portion defined by a transverse tear line and a cutout for facilitating removal of the removable portion.

FIG. 6 schematically depicts another blank 600 according to various aspects of the invention. In this example, the blank 600 includes a removable portion 658 defined at least partially by a transverse tear line 660 extending across at least a portion of panels 602, 604a, 604b, 606, 608. The removable portion 658 includes a somewhat elongate cutout 652 in the first main panel 602 and the second minor panel 608 terminating proximate to fold line 650. The portion of cutout 652 in the first main panel 602 is somewhat semi-circular in shape with an arcuate grasping edge 688. The portion of the cutout 652 in the second minor panel 608 is generally rectangular or square in shape. Tear lines 666a, 666b extend from edge 688 towards, and may abut, edge 664 and transverse tear line 660, respectively, and cooperate with grasping edge 688 to facilitate removal of the removable portion 658.

Figure 7:
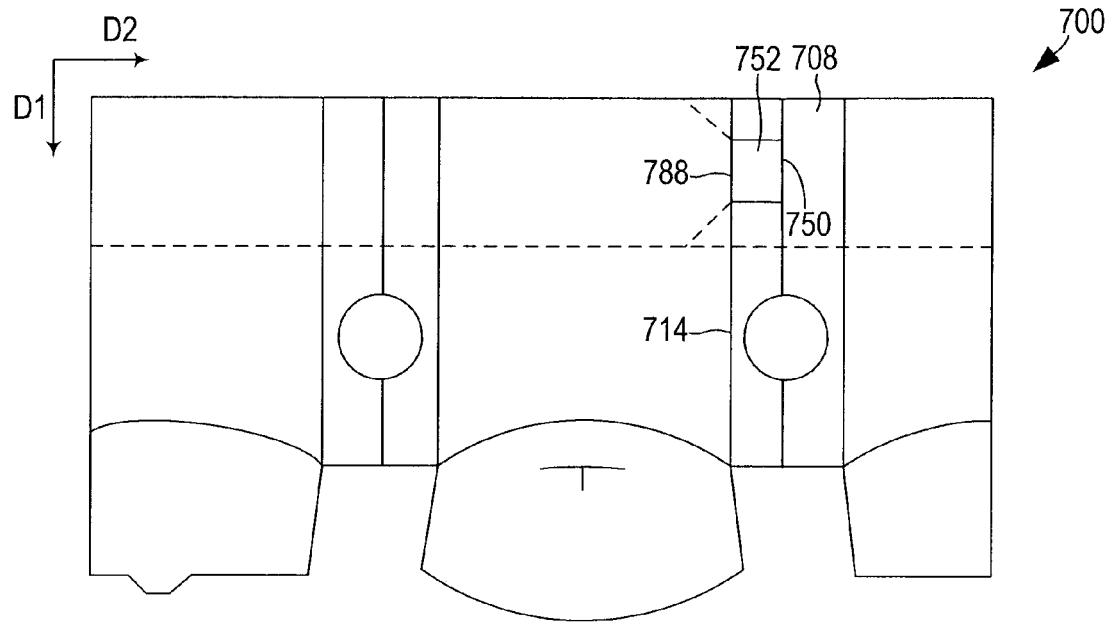
FIG. 7 is a schematic top plan view of yet another exemplary blank according to various aspects of the invention, including a removable portion defined by a transverse tear line and a cutout for facilitating removal of the removable portion.

FIG. 7 schematically depicts another blank 700 according to various aspects of the invention. The blank of FIG. 7 is similar to the blank of FIG. 6, except that cutout 752 lies within the second minor panel 708 and extends substantially between fold lines 714 and 750. The cutout 752 is somewhat square or rectangular in shape with a substantially straight grasping edge 788 substantially aligned with fold line 714.

Figure 8:
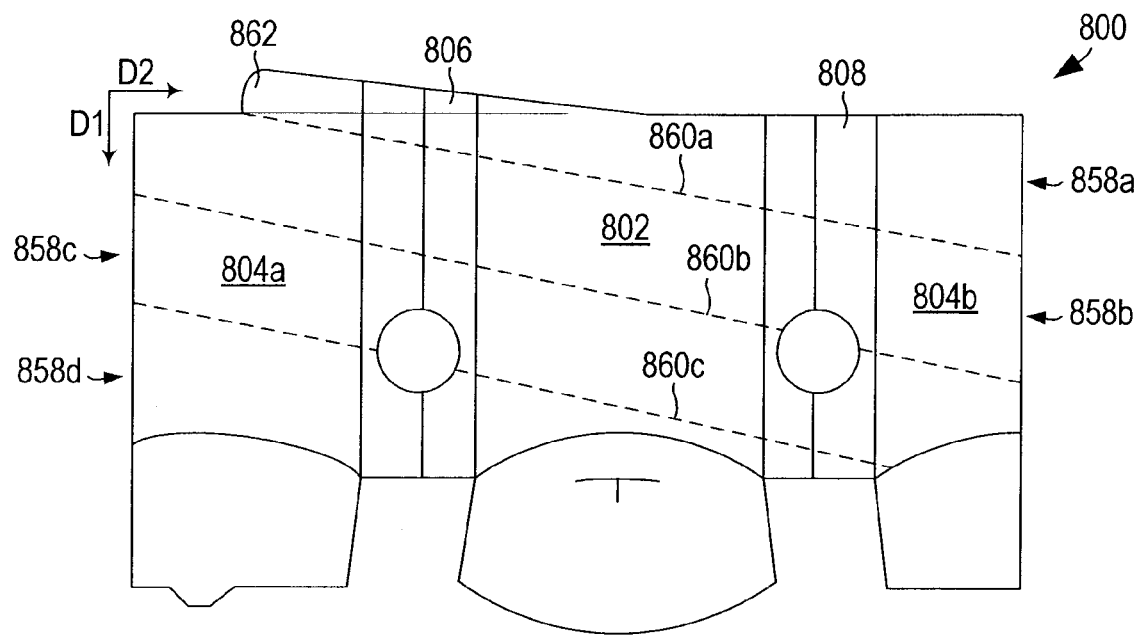
FIG. 8 is a schematic top plan view of still another exemplary blank according to various aspects of the invention, including a plurality of removable portions defined by oblique tear lines.

FIG. 8 schematically depicts another blank 800 according to various aspects of the invention. In this example, panels 802, 804a, 804b, 806, 808 collectively form a plurality of removable portions comprising tear strip sections 858a, 858b, 858c, 858d. In this example, each section 858a, 858b, 858c, 858d initiates at panel 804a, extends diagonally across panels 806, 802, 808, and terminates at panel 804b. However, it will be understood that any number of tear strip sections may be used, and each of such tear strip sections may initiate and terminate at any panel, as needed or desired for a particular application.

In this example, section 858a is joined to section 858b along oblique tear line 860a. Section 858b is joined to section 858c along an oblique tear line 860b. Section 858c is joined to section 858d along an oblique tear line 860c. In this example, tear lines 860a, 860b, 860c are substantially parallel. However, other configurations may be used with the invention. The various tear strip sections 858a, 858b, 858c, 858d and tear line segments 860a, 860b, 860c are positioned so that when the blank 800 is formed into a sleeve or other construct (not shown), the terminus of one section and corresponding tear line is the origin of the next. In this manner, a single, continuous tear strip may be formed along a substantially continuous oblique tear line (not shown).

The blank 800 includes a tab 862 or other grasping feature that facilitates initiation of a tear along tear line 860a. The tab 862 may have any suitable shape as desired. In this example, the tab 862 is shown as being a portion of the first major panel 804a. However, the tab 862 may be a portion of any of the various other panels, for example, panels 802, 806, 808, or 804b.

Figure 9:
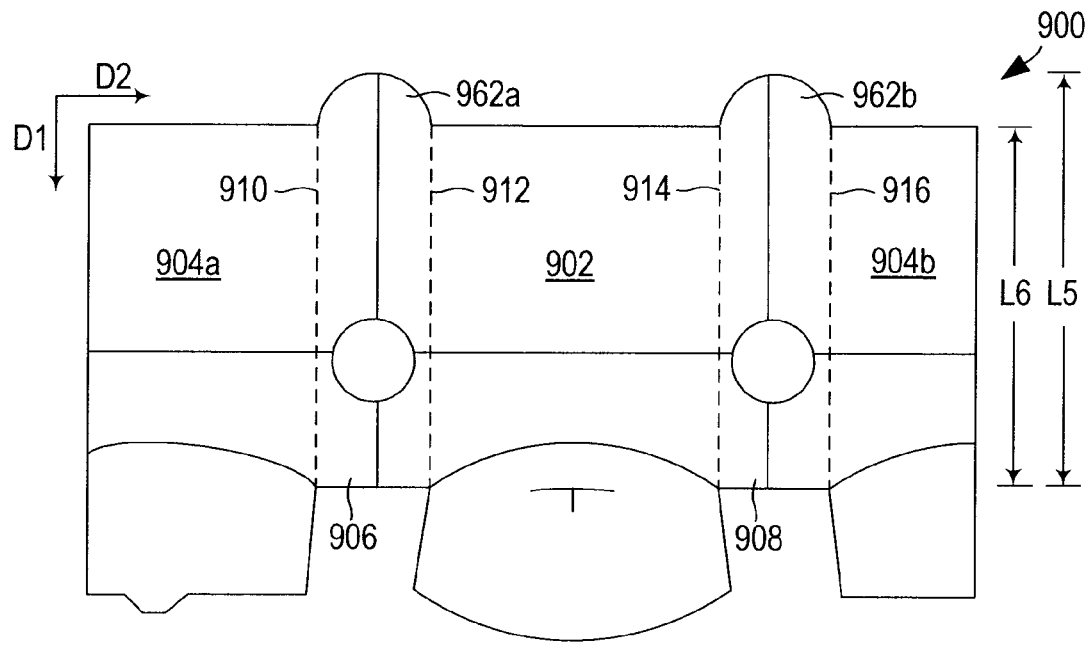
FIG. 9 is a schematic top plan view of another exemplary blank according to various aspects of the invention including various panels joined along longitudinal tear lines, where one or more of such panels may serve as a removable portion.

FIG. 9 schematically depicts another blank 900 according to various aspects of the invention. In this example, panels 902, 904a, 904b, 906, 908 are joined along respective longitudinal tear lines 910, 912, 914, 916.

Any one or more of panels 902, 904a, 904b, 906, 908 may serve as a removable portion of the blank 900 or construct formed therefrom (not shown) by tearing at least partially along at least one of longitudinal tear lines 910, 912, 914, 916. For example, first major panel 904a may be separated at least partially from the remainder of the blank 900 by tearing along tear line 910. First minor panel 906 may be separated at least partially from the remainder of the blank 900 by tearing along tear line 910 and/or tear line 912. Main panel 902 may be separated at least partially from the remainder of the blank 900 by tearing along tear line 912 and/or tear line 914. Second minor panel 908 may be separated at least partially from the remainder of the blank 900 by tearing along tear line 914 and/or tear line 916. Second major panel 904b may be separated at least partially from the remainder of the blank 900 by tearing along tear line 916.

Tear lines 910, 912, 914, 916 also serve as fold lines in forming a construct (not shown). However, it is contemplated that the removable portion of the blank may be formed or defined by one or more lines of disruption that do not also serve as fold lines.

The first minor panel 906 and the second minor panel 908 include respective extensions or tabs 962a, 962b that extend beyond panels 902, 904a, 904b, such that the overall length L5 of each of minor panels 906, 908 including respective extensions 962a, 962b is greater than the length L6 of panels 902, 904a, 904b (measured at the longest point). In this example, tabs 962a, 962b are somewhat semi-circular or obround in shape. However, numerous other shapes are contemplated hereby, such as those described above. Either or both tabs 962a, 962b may be grasped by a user to facilitate separation of the construct (not shown) along one or more of tear lines 910, 912, 914, 916 to gain access to a food item (not shown) inside.

Figure 10:
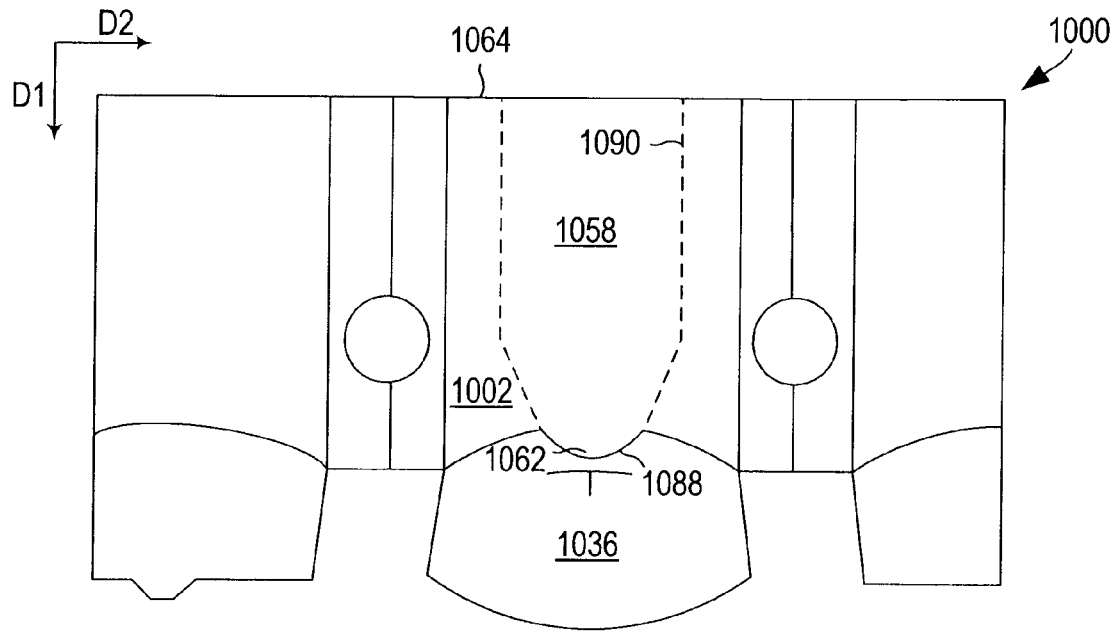
FIG. 10 is a schematic top plan view of another exemplary blank according to various aspects of the invention, including a removable portion defined by a line of disruption initiating and terminating proximate an edge of the blank.

FIG. 10 schematically depicts still another blank 1000 according to various aspects of the invention. In this example, the main panel 1002 includes a removable portion 1058 defined by a line of disruption 1090, for example, a tear line or an offset kiss cut line, that initiates and terminates along the peripheral edge 1064 of the blank 1000 along the main panel 1002. In the example illustrated in FIG. 10, the removable portion 1058 generally resembles an arrow with an arcuate tab or extension 1062 defined at least partially by a cut line or slit 1088 adjacent to end panel 1036. The tab 1062 generally may be shaped to facilitate separation of the removable portion 1058 from the main panel 1002.

Figure 11:
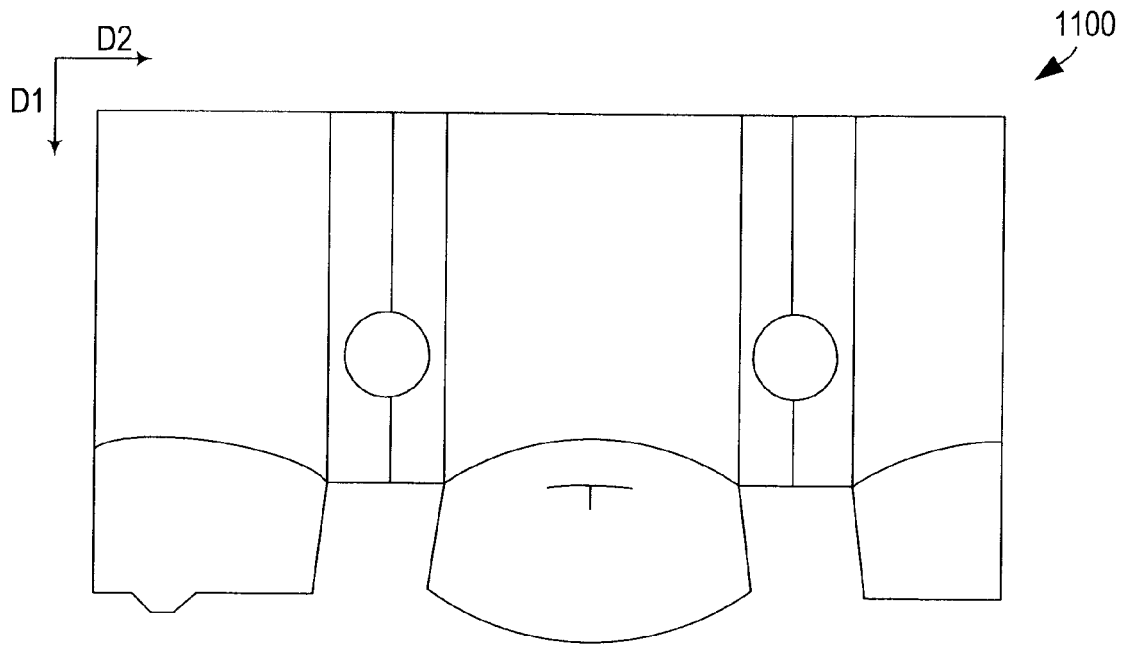
FIG. 11 is a schematic top plan view of still another exemplary blank according to various aspects of the invention, without a removable portion.

While the various blanks and constructs illustrated in FIGS. 1A-10 include a removable portion, it will be understood that numerous blanks and constructs without a removable portion are contemplated by the invention. For example, FIG. 11 schematically depicts a blank 1000 similar to FIG. 10 without the removable portion 1058. A sleeve, container, or other construct (not shown) may be formed from the blank 1100 in a manner similar to that described above. However, a container formed from the blank 1100 would not include a removable portion defined by one or more lines of disruption. Thus, the user may need to remove the food item from the container when the food item becomes difficult to access. Alternatively, the user may manually tear and/or remove one or more portions of the container to access the food item.

Numerous materials may be suitable for use in forming the various blanks and constructs of the invention, provided that the materials are resistant to softening, scorching, combusting, or degrading at typical microwave oven heating temperatures, for example, at from about 250° F. to about 425° F. The particular materials used may include microwave energy interactive materials and microwave energy transparent or inactive materials.

For example, any of the various blanks or constructs of the present invention may include one or more features that alter the effect of microwave energy during the heating or cooking of the food item. For example, the blank or construct may be formed at least partially from one or more microwave energy interactive elements (hereinafter sometimes referred to as "microwave interactive elements") that promote browning and/or crisping of a particular area of the food item, shield a particular area of the food item from microwave energy to prevent overcooking thereof, or transmit microwave energy toward or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular microwave heating construct and food item.

The microwave interactive element may be supported on a microwave inactive or transparent substrate for ease of handling and/or to prevent contact between the microwave energy interactive material and the food item. As a matter of convenience and not limitation, and although it is understood that a microwave interactive element supported on a microwave transparent substrate includes both microwave interactive and microwave inactive elements or components, such constructs are referred to herein as "microwave interactive webs".

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use with the present invention include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide. Examples of metal oxides that may be suitable for use with the present invention include, but are not limited to, oxides of aluminum, iron, and tin, used in conjunction with an electrically conductive material where needed. Another example of a metal oxide that may be suitable for use with the present invention is indium tin oxide (ITO). ITO can be used as a microwave energy interactive material to provide a heating effect, a shielding effect, a browning and/or crisping effect, or a combination thereof. For example, to form a susceptor, ITO may be sputtered onto a clear polymer film. The sputtering process typically occurs at a lower temperature than the evaporative deposition process used for metal deposition. ITO has a more uniform crystal structure and, therefore, is clear at most coating thicknesses. Additionally, ITO can be used for either heating or field management effects. ITO also may have fewer defects than metals, thereby making thick coatings of ITO more suitable for field management than thick coatings of metals, such as aluminum.

Alternatively, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In one example, the microwave interactive element may comprise a thin layer of microwave interactive material (generally less than about 100 angstroms in thickness, for example, from about 60 to about 100 angstroms in thickness) that tends to absorb at least a portion of impinging microwave energy and convert it to thermal energy (i.e., heat) at the interface with a food item. Such elements often are used to promote browning and/or crisping of the surface of a food item (sometimes referred to as a "browning and/or crisping element"). When supported on a film or other substrate, such an element may be referred to as a "susceptor film" or, simply, "susceptor". Where the substrate is a blank, carton, or other construct including a plurality of panels, a susceptor may overlie all or a portion of one or more of the panels, as illustrated schematically in FIG. 1B, and may form at least a portion of the surface proximate the food item, as illustrated schematically in FIGS. 1C-1H. However, other microwave energy interactive elements, such as those described herein, are contemplated for use with the invention.

For example, the microwave interactive element may comprise a foil having a thickness sufficient to shield one or more selected portions of the food item from microwave energy (sometimes referred to as a "shielding element"). Such shielding elements may be used where the food item is prone to scorching or drying out during heating. The shielding element may be formed from various materials and may have various configurations, depending on the particular application for which the shielding element is used. Typically, the shielding element is formed from a conductive, reflective metal or metal alloy, for example, aluminum, copper, or stainless steel. The shielding element generally may have a thickness of from about 0.000285 inches to about 0.05 inches. In one aspect, the shielding element has a thickness of from about 0.0003 inches to about 0.03 inches. In another aspect, the shielding element has a thickness of from about 0.00035 inches to about 0.020 inches, for example, 0.016 inches.

As still another example, the microwave interactive element may comprise a segmented foil, such as, but not limited to, those described in U.S. Pat. Nos. 6,204,492, 6,433,322, 6,552,315, and 6,677,563, each of which is incorporated by reference in its entirety. Although segmented foils are not continuous, appropriately spaced groupings of such segments may act as a transmitting element to direct microwave energy to specific areas of the food item. Such foils also may be used in combination with browning and/or crisping elements, for example, susceptors.

Any of the numerous microwave interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and/or positioned to heat particular areas of the food item selectively. As stated previously, the number, shape, size, and positioning of such breaks or apertures may vary for a particular application depending on type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, whether and to what extent there is a need for venting, and numerous other factors.

It will be understood that the aperture may be a physical aperture or void in the material used to form the construct, or may be a non-physical "aperture". A non-physical aperture may be a portion of the construct that is microwave energy inactive by deactivation or otherwise, or one that is otherwise transparent to microwave energy. Thus, for example, the aperture may be a portion of the construct formed without a microwave energy interactive material or, alternatively, may be a portion of the construct formed with a microwave energy interactive material that has been deactivated. While both physical and non-physical apertures allow the food item to be heated directly by the microwave energy, a physical aperture also provides a venting function to allow steam or other vapors to be released from the food item.

It also may be beneficial to create one or more discontinuities or inactive regions to prevent overheating or charring of the construct. By way of example, and not limitation, in the constructs 174, 182 illustrated in FIGS. 1C-1H, panels 104a and 104b are overlapped to form the second main panel 104. When exposed to microwave energy, the concentration of heat generated by the overlapped panels may be sufficient to cause the underlying support, in this case, paperboard, to become scorched. As such, the overlapping portions of one or both of panels 104a and 104b may be designed to be microwave inactive, for example, by forming these areas without a microwave energy interactive material or by deactivating the microwave energy interactive material in these areas.

Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment.

As stated above, any of the above elements and numerous others contemplated hereby may be supported on a substrate. The substrate typically comprises an electrical insulator, for example, a polymer film or other polymeric material. As used herein the terms "polymer", "polymer film", and "polymeric material" include, but are not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries.

The thickness of the film typically may be from about 35 gauge to about 10 mil. In one aspect, the thickness of the film is from about 40 to about 80 gauge. In another aspect, the thickness of the film is from about 45 to about 50 gauge. In still another aspect, the thickness of the film is about 48 gauge. Examples of polymer films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

In one example, the polymer film comprises polyethylene terephthalate (PET). Polyethylene terephthalate films are used in commercially available susceptors, for example, the QWIKWAVE® Focus susceptor and the MICRORITE® susceptor, both available from Graphic Packaging International (Marietta, Ga.). Examples of polyethylene terephthalate films that may be suitable for use as the substrate include, but are not limited to, MELINEX®, commercially available from DuPont Teijan Films (Hopewell, Va.), SKYROL, commercially available from SKC, Inc. (Covington, Ga.), and BARRIALOX PET, available from Toray Films (Front Royal, Va.), and QU50 High Barrier Coated PET, available from Toray Films (Front Royal, Va.).

The polymer film may be selected to impart various properties to the microwave interactive web, for example, printability, heat resistance, or any other property. As one particular example, the polymer film may be selected to provide a water barrier, oxygen barrier, or a combination thereof. Such barrier film layers may be formed from a polymer film having barrier properties or from any other barrier layer or coating as desired. Suitable polymer films may include, but are not limited to, ethylene vinyl alcohol, barrier nylon, polyvinylidene chloride, barrier fluoropolymer, nylon 6, nylon 6,6, coextruded nylon 6/EVOH/nylon 6, silicon oxide coated film, barrier polyethylene terephthalate, or any combination thereof.

One example of a barrier film that may be suitable for use with the present invention is CAPRAN® EMBLEM 1200M nylon 6, commercially available from Honeywell International (Pottsville, Pa.). Another example of a barrier film that may be suitable is CAPRAN® OXYSHIELD OBS monoaxially oriented coextruded nylon 6/ethylene vinyl alcohol (EVOH)/nylon 6, also commercially available from Honeywell International. Yet another example of a barrier film that may be suitable for use with the present invention is DARTEK® N-201 nylon 6,6, commercially available from Enhance Packaging Technologies (Webster, N.Y.). Additional examples include BARRIALOX PET, available from Toray Films (Front Royal, Va.) and QU50 High Barrier Coated PET, available from Toray Films (Front Royal, Va.), referred to above.

Still other barrier films include silicon oxide coated films, such as those available from Sheldahl Films (Northfield, Minn.). Thus, in one example, a susceptor may have a structure including a film, for example, polyethylene terephthalate, with a layer of silicon oxide coated onto the film, and ITO or other material deposited over the silicon oxide. If needed or desired, additional layers or coatings may be provided to shield the individual layers from damage during processing.

The barrier film may have an oxygen transmission rate (OTR) as measured using ASTM D3985 of less than about 20 $cc/m^2/day$. In one aspect, the barrier film has an OTR of less than about 10 $cc/m^2/day$. In another aspect, the barrier film has an OTR of less than about 1 $cc/m^2/day$. In still another aspect, the barrier film has an OTR of less than about 0.5 $cc/m^2/day$. In yet another aspect, the barrier film has an OTR of less than about 0.1 $cc/m^2/day$.

The barrier film may have a water vapor transmission rate (WVTR) of less than about 100 $g/m^2/day$ as measured using ASTM F1249. In one aspect, the barrier film has a WVTR of less than about 50 $g/m^2/day$. In another aspect, the barrier film has a WVTR of less than about 15 $g/m^2/day$. In yet another aspect, the barrier film has a WVTR of less than about 1 $g/m^2/day$. In still another aspect, the barrier film has a WVTR of less than about 0.1 $g/m^2/day$. In a still further aspect, the barrier film has a WVTR of less than about 0.05 $g/m^2/day$.

Other non-conducting substrate materials such as metal oxides, silicates, cellulosics, or any combination thereof, also may be used in accordance with the present invention.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth. Examples of various patterns and methods that may be suitable for use with the present invention are provided in U.S. Pat. Nos. 6,765,182; 6,717,121; 6,677,563; 6,552,315; 6,455,827; 6,433,322; 6,410,290; 6,251,451; 6,204,492; 6,150,646; 6,114,679; 5,800,724; 5,759,418; 5,672,407; 5,628,921; 5,519,195; 5,420,517; 5,410,135; 5,354,973; 5,340,436; 5,266,386; 5,260,537; 5,221,419; 5,213,902; 5,117,078; 5,039,364; 4,963,420; 4,936,935; 4,890,439; 4,775,771; 4,865,921; and Re. 34,683, each of which is incorporated by reference herein in its entirety. Although particular examples of patterns of microwave energy interactive material are shown and described herein, it should be understood that other patterns of microwave energy interactive material are contemplated by the present invention.

The microwave interactive element or microwave interactive web may be joined to or overlie a dimensionally stable, microwave energy transparent support (also referred to as "microwave transparent support", "microwave inactive support" or "support") to form at least a portion of the construct.

In one aspect, for example, where a rigid or semi-rigid construct is to be formed, all or a portion of the support may be formed at least partially from a paperboard material, which may be cut into a blank prior to use in the construct. For example, the support may be formed from paperboard having a basis weight of from about 60 to about 330 lbs/ream, for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

In another aspect, where a more flexible construct is to be formed, the support may comprise a paper or paper-based material generally having a basis weight of from about 15 to about 60 lbs/ream, for example, from about 20 to about 40 lbs/ream. In one particular example, the paper has a basis weight of about 25 lbs/ream.

Optionally, one or more portions or sides of the various blanks or other constructs described herein or contemplated hereby may be coated with varnish, clay, or other materials, either alone or in combination. For example, at least the side of the support that will form an exterior surface of a construct erected therefrom may be coated with a clay coating or other base coating. The coating may then be printed over with product advertising, images, price coding, any other information or indicia, or any combination thereof. The blank or construct may then be overcoated with a varnish to protect any information printed thereon.

Furthermore, the blanks or other constructs may be coated with, for example, a moisture and/or oxygen barrier layer, on either or both sides, such as those described above. Any suitable moisture and/or oxygen barrier material may be used in accordance with the present invention. Examples of materials that may be suitable include, but are not limited to, polyvinylidene chloride, ethylene vinyl alcohol, DuPont DARTEK™ nylon 6,6, and others referred to above.

Alternatively or additionally, any of the blanks or other constructs of the present invention may be coated or laminated with other materials to impart other properties, such as absorbency, repellency, opacity, color, printability, stiffness, or cushioning. For example, absorbent susceptors are described in U.S. Provisional Application No. 60/604,637, filed Aug. 25, 2004, and U.S. Patent Application Publication No. US 2006/0049190 A1, published Mar. 9, 2006, both of which are incorporated herein by reference in their entirety. Additionally, the blanks or other constructs may include graphics or indicia printed thereon.

It will be understood that with some combinations of elements and materials, the microwave interactive element may have a grey or silver color that is visually distinguishable from the substrate or the support. However, in some instances, it may be desirable to provide a web or construct having a uniform color and/or appearance. Such a web or construct may be more aesthetically pleasing to a consumer, particularly when the consumer is accustomed to packages or containers having certain visual attributes, for example, a solid color, a particular pattern, and so on. Thus, for example, the present invention contemplates using a silver or grey toned adhesive to join the microwave interactive elements to the substrate, using a silver or grey toned substrate to mask the presence of the silver or grey toned microwave interactive element, using a dark toned substrate, for example, a black toned substrate, to conceal the presence of the silver or grey toned microwave interactive element, overprinting the metallized side of the web with a silver or grey toned ink to obscure the color variation, printing the non-metallized side of the web with a silver or grey ink or other concealing color in a suitable pattern or as a solid color layer to mask or conceal the presence of the microwave interactive element, or any other suitable technique or combination thereof.

In the examples shown herein, the construct is somewhat rectangular in shape, suitable, for example, for heating a sandwich or breakfast pastry therein. However, it will be understood that in this and other aspects of the invention described herein or contemplated hereby, numerous suitable shapes and configurations may be used to form the various panels and, therefore, constructs. Examples of other shapes encompassed hereby include, but are not limited to, polygons, circles, ovals, cylinders, prisms, spheres, polyhedrons, and ellipsoids. The shape of each panel may be determined largely by the shape of the food item, and it should be understood that different packages are contemplated for different food items, for example, sandwiches, pizzas, French fries, soft pretzels, pizza bites, cheese sticks, pastries, doughs, and so forth. The construct may be flexible, semi-rigid, rigid, or may include a variety of components having different degrees of flexibility. Likewise, the construct may include gussets, pleats, or any other feature needed or desired to accommodate a particular food item and/or portion size. Additionally, it will be understood that the present invention contemplates blanks and constructs for single-serving portions and for multiple-serving portions.

Although certain embodiments of this invention have been described with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

It will be understood that in each of the various blanks and trays described herein and contemplated hereby, a "fold line" can be any substantially linear, although not necessarily straight, form of weakening that facilitates folding thereal-ong. More specifically, but not for the purpose of narrowing the scope of the present invention, a fold line may be a score line, such as lines formed with a blunt scoring knife, or the like, which creates a crushed portion in the material along the desired line of weakness, a cut that extends partially into a material along the desired line of weakness, and/or a series of cuts that extend partially into and/or completely through the material along the desired line of weakness; or any combination of these features.

For example, one type of conventional tear line is in the form of a series of cuts that extend completely through the material, with adjacent cuts being spaced apart slightly so that a nick (e.g., a small somewhat bridging-like piece of the material) is defined between the adjacent cuts for typically temporarily connecting the material across the tear line. The nicks are broken during tearing along the tear line. Such a tear line that includes nicks can also be referred to as a cut line, since the nicks typically are a relatively small percentage of the subject line, and alternatively the nicks can be omitted from such a cut line.

Furthermore, various exemplary blanks and constructs are shown and described herein as having fold lines, tear lines, score lines, cut lines, kiss cut lines, and other lines as extending from a particular feature to another particular feature, for example from one particular panel to another, from one particular edge to another, or any combination thereof. However, it will be understood that such lines need not necessarily extend between such features in a precise manner. Instead, such lines may generally extend between the various features as needed to achieve the objective of such line. For instance, where a particular tear line is shown as extending from a first edge of a blank to another edge of the blank, the tear line need not extend completely to one or both of such edges. Rather, the tear line need only extend to a location sufficiently proximate to the edge so that the removable strip, panel, or portion can be manually separated from the blank or construct without causing undesirable damage thereto.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the invention as set forth in the following claims.

While the present invention is described herein in detail in relation to specific aspects, it is to be understood that this detailed description is only illustrative and exemplary of the present invention and is made merely for purposes of providing a full and enabling disclosure of the present invention and to provide the best mode contemplated by the inventor or inventors of carrying out the invention. The detailed description set forth herein is not intended nor is to be construed to limit the present invention or otherwise to exclude any such other embodiments, adaptations, variations, modifications, and equivalent arrangements of the present invention.

What is claimed is:

1. A microwave heating construct, comprising:
   a first main panel and a second main panel opposite one another;
   a first minor panel and a second minor panel opposite one another, the first minor panel and the second minor panel being foldably joined to the first main panel and the second main panel;
   a first end panel foldably joined to the first main panel along a first fold line, the first end panel including a pair of side edges that extend divergently from one another from the first main panel to an end edge of the first end panel; and
   a second end panel foldably joined to the second main panel along a second fold line, the second end panel including a pair of opposed side edges that extend from the second main panel to an end edge of the second end panel,
   wherein
      the first end panel and the second end panel each have a length measured from the respective first fold line or second fold line to the respective end edge of the first end panel or second end panel midway between the respective opposed side edges, and
      the length of the first end panel is greater than the length of the second end panel, and wherein at least one of the first main panel, second main panel, first minor panel, second minor panel, first end panel, and second end panel includes microwave energy interactive material.

2. The construct of claim 1, wherein the end edge of the first end panel and the end edge of the second end panel are free edges of the construct.

3. The construct of claim 1, wherein the end edge of the first end panel is outwardly arcuate in shape.

4. The construct of claim 1, wherein the pair of opposed side edges of the second end panel extend convergently from the second main panel to the end edge of the second end panel.

5. The construct of claim 1, wherein the end edge of the second end panel is substantially linear in shape.

6. The construct of claim 1, wherein the microwave energy interactive material comprises a susceptor, a foil patch, a segmented foil, or any combination thereof.

7. The construct of claim 1, wherein the microwave energy interactive material is operative for converting at least a portion of impinging microwave energy into heat.

8. The construct of claim 1, further comprising a removable portion including at least a portion of at least one of the first main panel, the second main panel, the first minor panel, and the second minor panel.

9. The construct of claim 8, wherein the removable portion is defined at least partially by
a transverse tear line extending substantially across at least one of the first main panel, second main panel, first minor panel, and second minor panel,
an oblique tear line substantially abutting the transverse tear line, and
a cutout adjacent to the oblique tear line.

10. The construct of claim 9, wherein the cutout extends inwardly from an end of the construct and at least partially defines a tab.

11. The construct of claim 9, wherein the cutout is disposed within at least one of the first main panel, second main panel, first minor panel, and second minor panel distal from an end of the construct.

12. The construct of claim 8, wherein
the removable portion is defined at least partially by a transverse tear line extending substantially across each of the first main panel, second main panel, first minor panel, and second minor panel, and
the removable portion includes a grasping feature projecting from at least one of the first main panel and the second main panel distal from the first minor panel and the second minor panel.

13. The construct of claim 12, wherein
the removable portion is a first removable portion,
the transverse tear line is a first transverse tear line,
the grasping feature is a first grasping feature, and
the construct further includes a second removable portion adjacent to the first removable portion, wherein
the second removable portion is defined at least partially by a second transverse tear line extending substantially across each of the first main panel, second main panel, first minor panel, and second minor panel, and
the second removable portion includes a second grasping feature projecting from at least one of the first main panel and the second main panel distal from the first minor panel and the second minor panel.

14. The construct of claim 8, wherein
the removable portion is defined at least partially by a transverse tear line extending substantially across at least the first main panel and the second main panel, and
the removable portion includes a grasping feature defined by a line of disruption in the second minor panel.

15. The construct of claim 8, wherein the removable portion is defined at least partially by a line of disruption extending obliquely across at least one of the first main panel, the second main panel, the first minor panel, and the second minor panel.

16. The construct of claim 8, wherein
at least one of the fold lines adjoining the first main panel, the second main panel, the first minor panel, and the second minor panel is a tear line, and
the removable portion is defined by at least one tear line that adjoins
at least one of the first main panel and the second main panel, and
at least one of the first minor panel and the second minor panel.

17. The construct of claim 8, wherein the removable portion is defined by a line of disruption initiating and terminating proximate an end of at least one of the adjoined panels.

18. The construct of claim 17, wherein the line of disruption includes a first portion extending from an end of at least one of the adjoined panels, a second portion extending obliquely from the first portion, and a third, arcuate portion.

19. The construct of claim 18, wherein the arcuate portion of the line of disruption lies substantially within the first end panel.

20. The construct of claim 19, wherein the arcuate portion of the line of disruption comprises a cut that defines a tab.

21. The construct of claim 1, wherein the first main panel, second main panel, first minor panel, second minor panel, first end panel, and second end panel define an interior space for receiving a food item.

22. The construct of claim 21, in combination with the food item, wherein the food item has a surface that is desirably at least one of browned and crisped.

23. A method of using the combination of claim 22, comprising exposing the food item within the interior space to microwave energy, so that the microwave energy interactive material converts at least a portion of the microwave energy into heat, and the surface of the food item is at least one of browned and crisped.

24. The method of claim 23, wherein
a locking projection extends from the end edge of the second end panel,
the first end panel includes a slot for receiving the locking projection, and
the method further comprises folding the first end panel and the second end panel towards the interior space and inserting the locking projection into the slot.

25. The method of claim 24, wherein
the construct includes a removable portion comprising at least a portion of at least one of the first main panel, the second main panel, the first minor panel, and the second minor panel, and
the method further comprises at least partially removing the removable portion of the construct.

* * * * *